No. 874,060. PATENTED DEC. 17, 1907.
H. L. FISHER.
ADDING ATTACHMENT FOR TYPE WRITING MACHINES.
APPLICATION FILED JUNE 3, 1902.
6 SHEETS—SHEET 1.
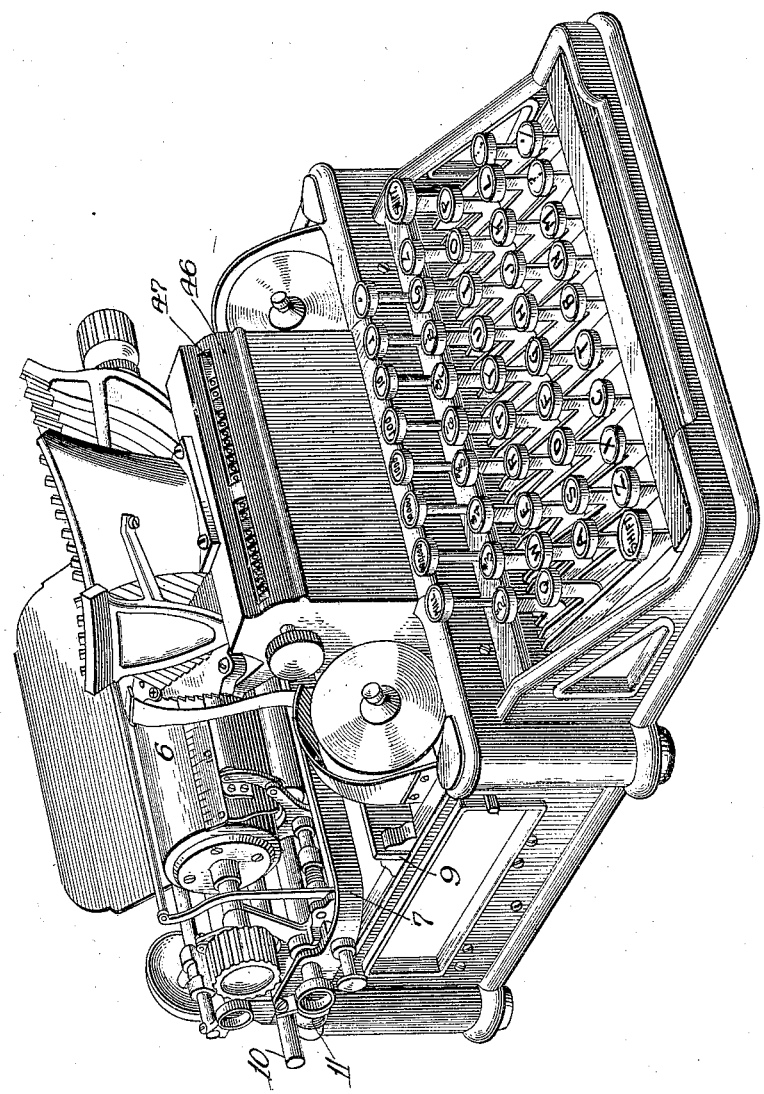

No. 874,060. PATENTED DEC. 17, 1907.
H. L. FISHER.
ADDING ATTACHMENT FOR TYPE WRITING MACHINES.
APPLICATION FILED JUNE 3, 1902.
6 SHEETS—SHEET 2.
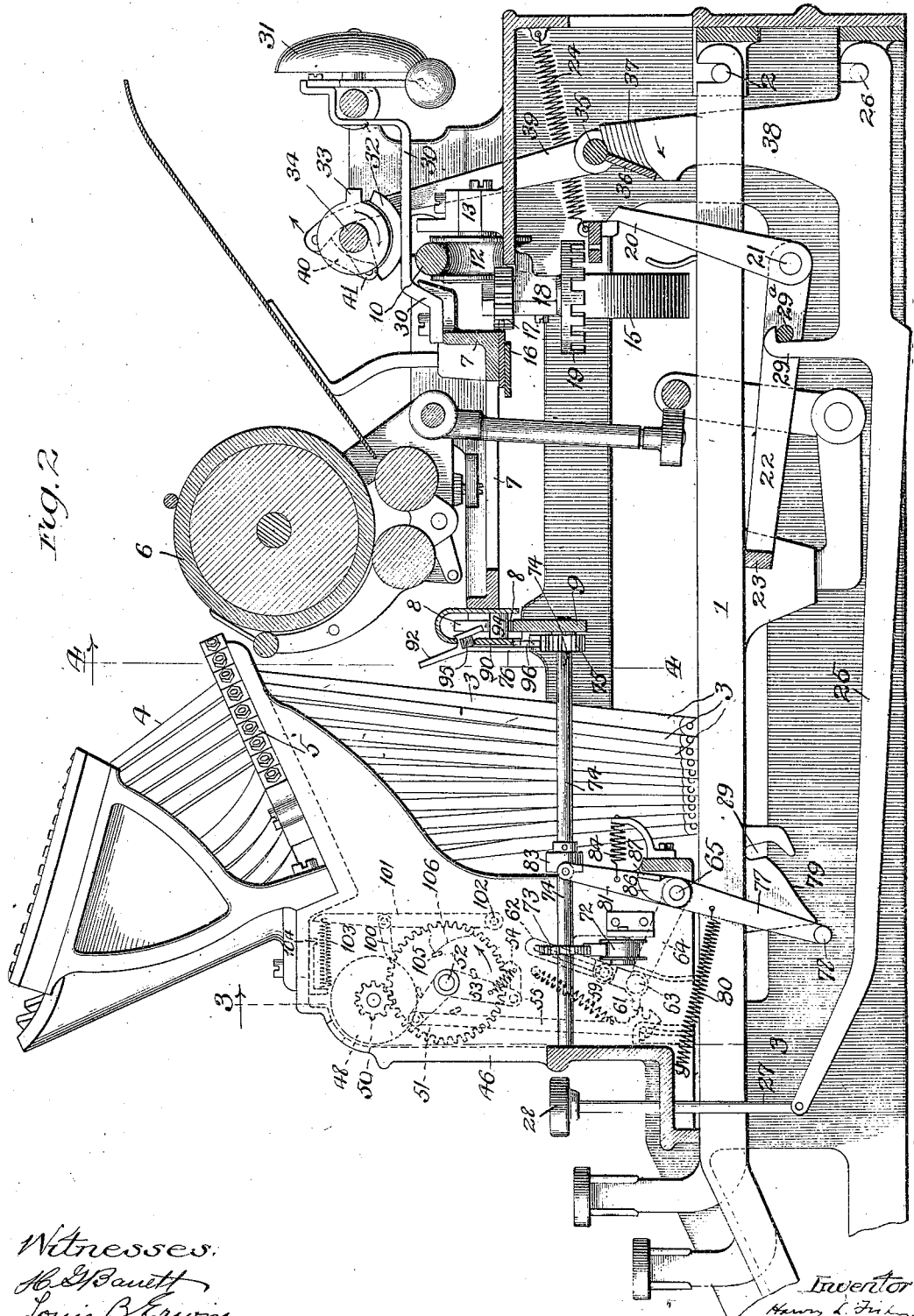

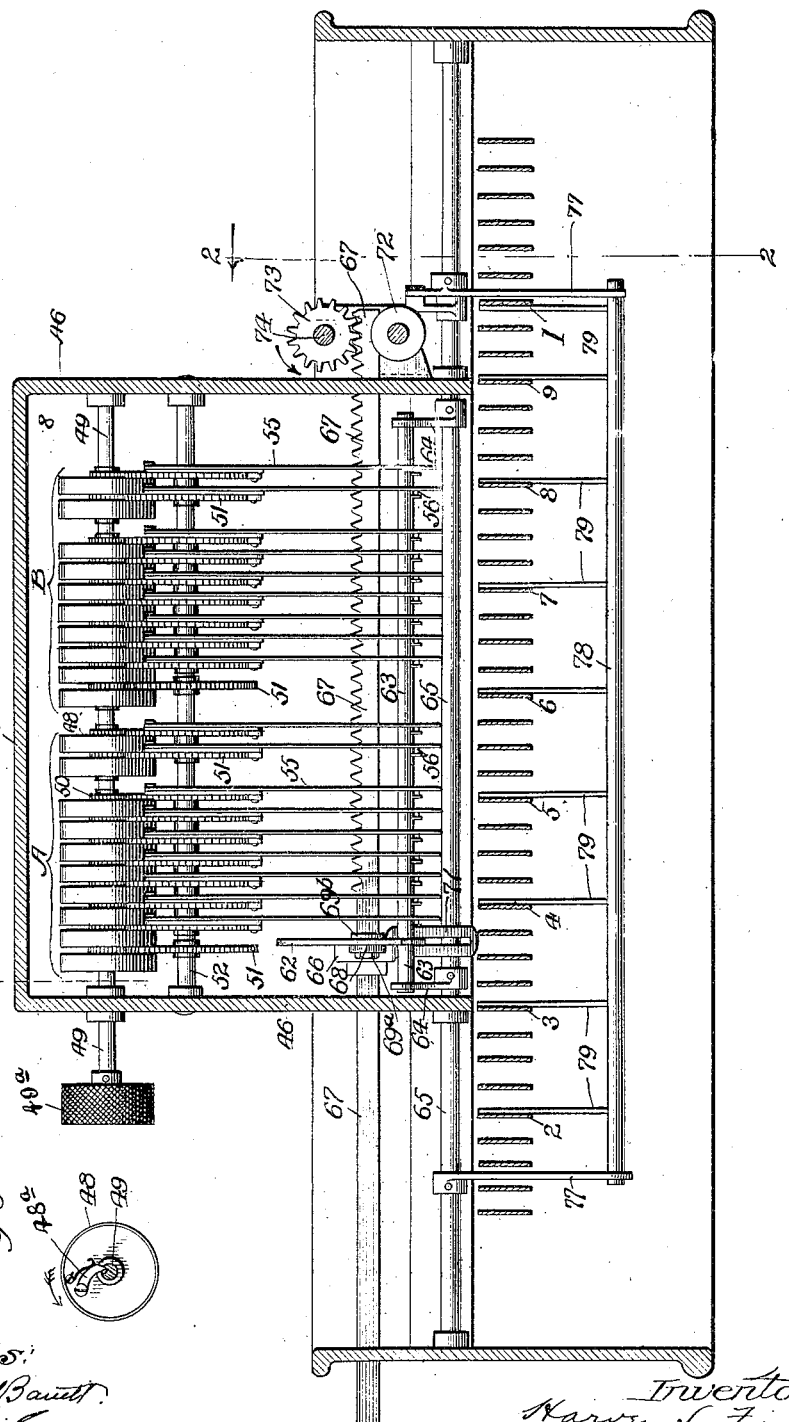

No. 874,060. PATENTED DEC. 17, 1907.
H. L. FISHER.
ADDING ATTACHMENT FOR TYPE WRITING MACHINES.
APPLICATION FILED JUNE 3, 1902.
6 SHEETS—SHEET 4.
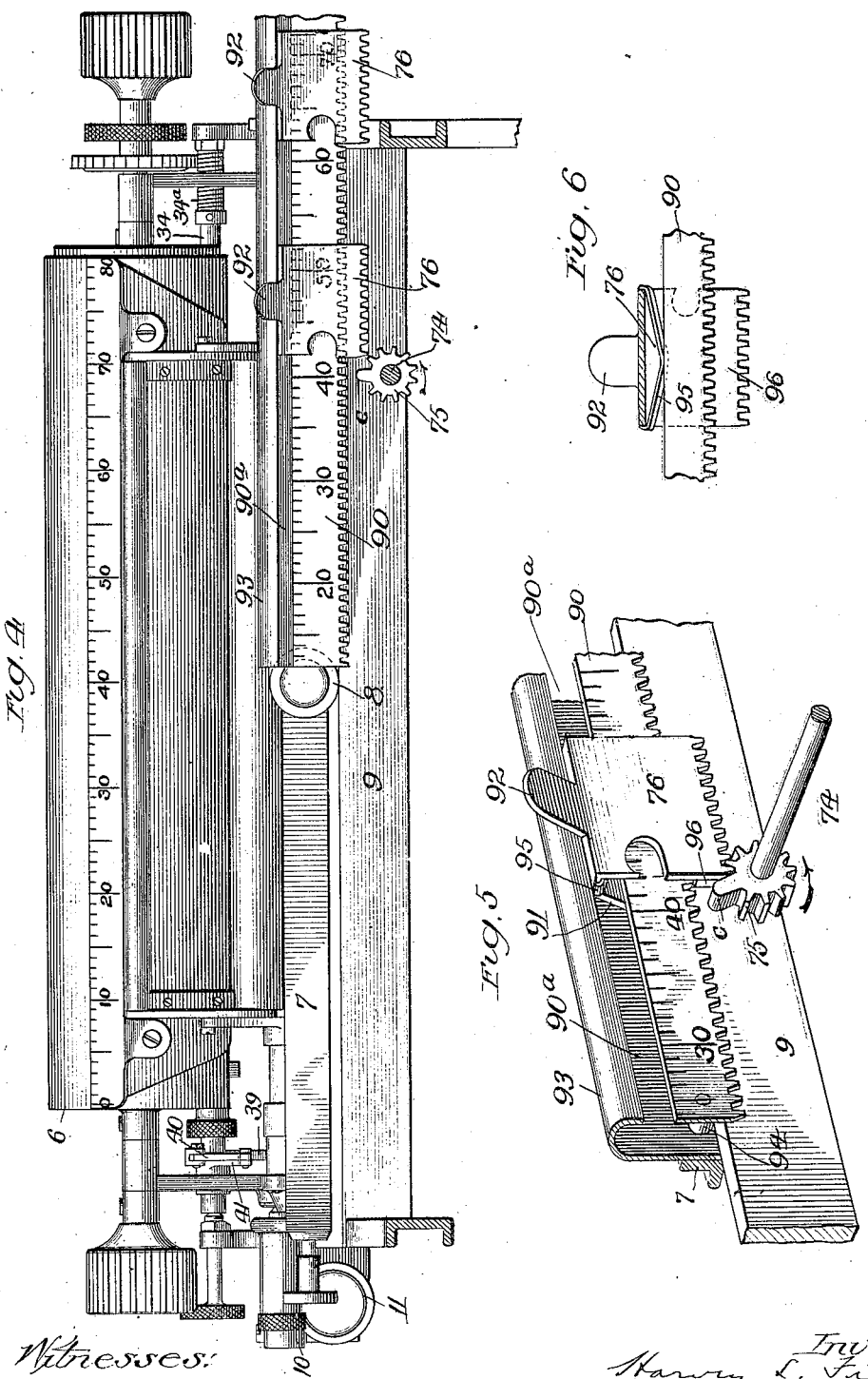

No. 874,060. PATENTED DEC. 17, 1907.
H. L. FISHER.
ADDING ATTACHMENT FOR TYPE WRITING MACHINES.
APPLICATION FILED JUNE 3, 1902.
6 SHEETS—SHEET 5.
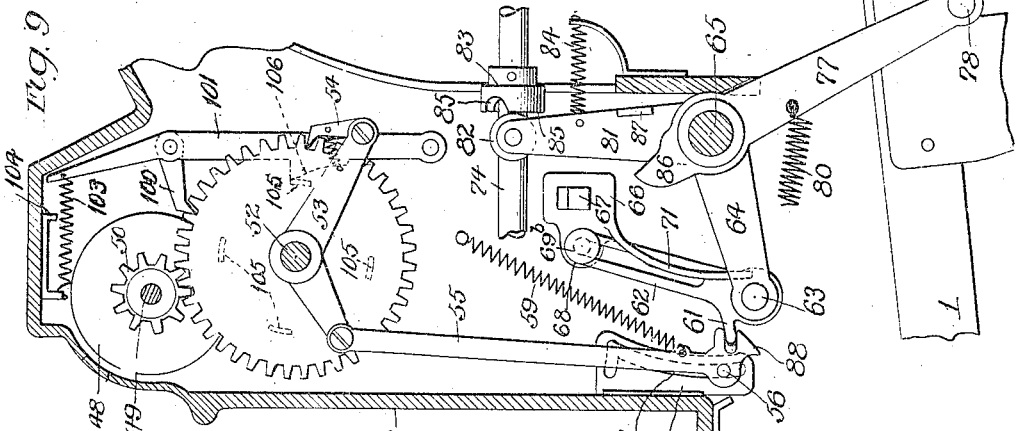
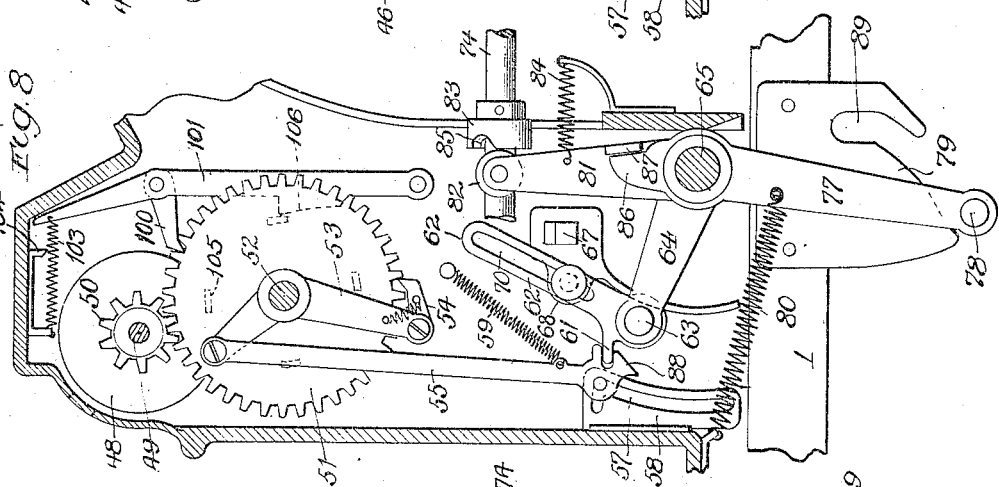
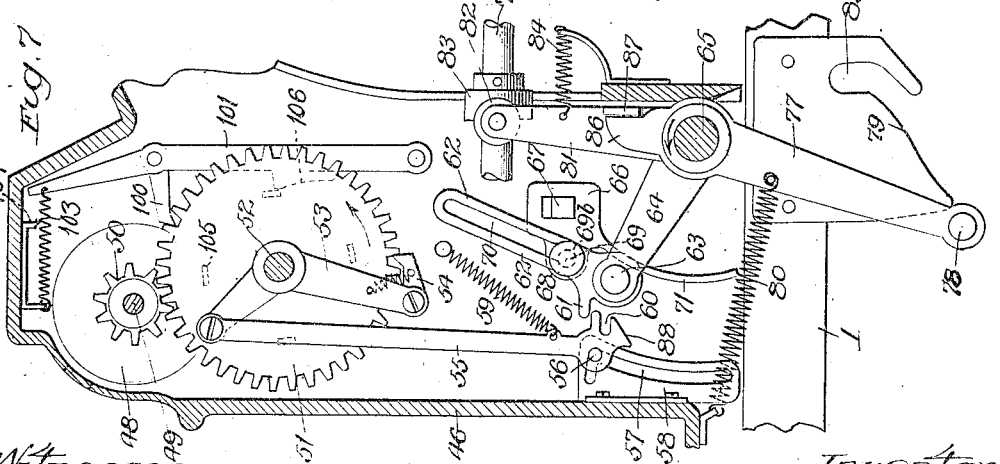
Witnesses:
Inventor:
Harry L. Fisher
By Rector & Hibben
His Attys

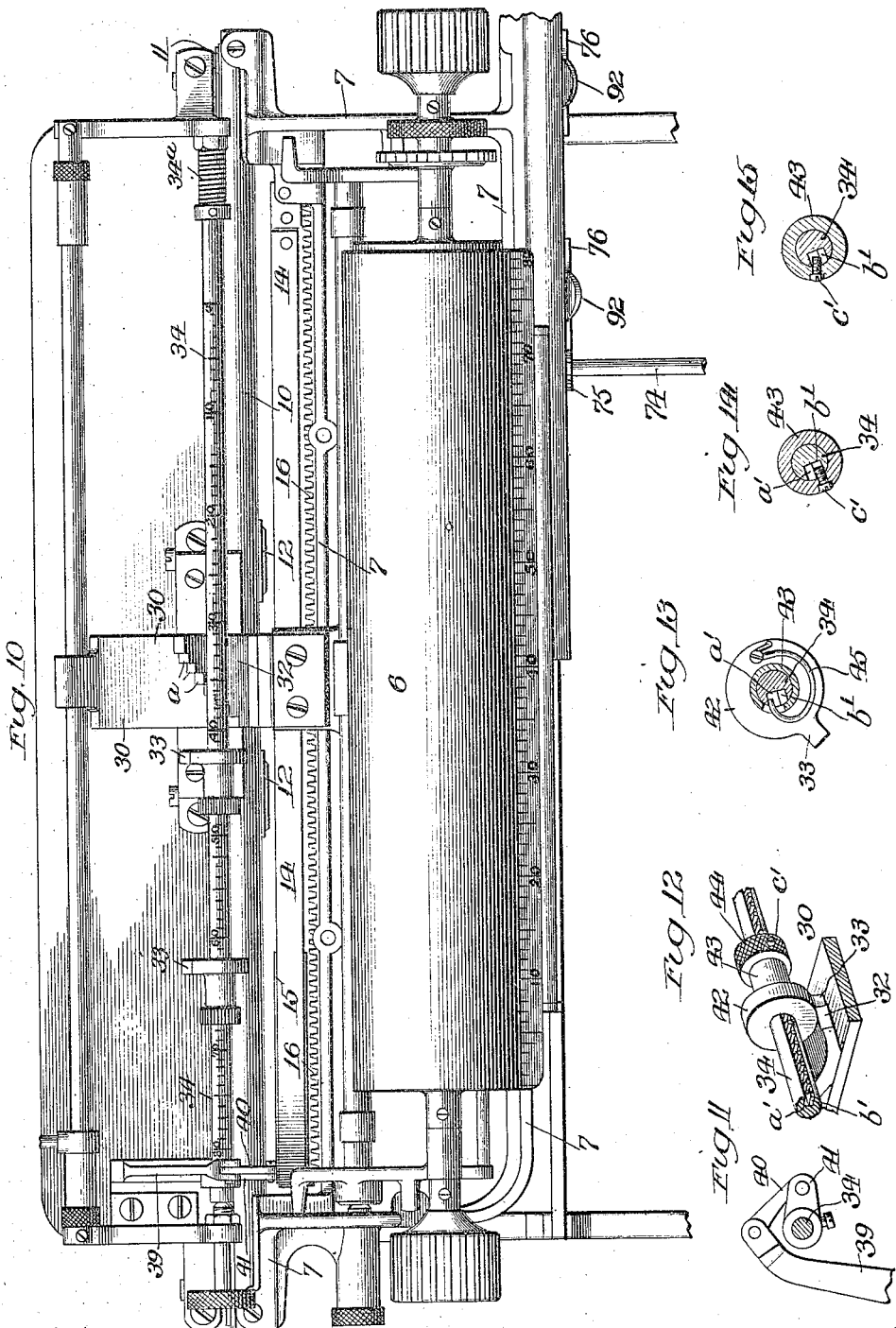

UNITED STATES PATENT OFFICE.

HARVEY L. FISHER, OF CHICAGO, ILLINOIS, ASSIGNOR TO FISHER MANUFACTURING COMPANY, OF CHICAGO, ILLINOIS, A CORPORATION OF ILLINOIS.

ADDING ATTACHMENT FOR TYPE-WRITING MACHINES.

No. 874,060.     Specification of Letters Patent.     Patented Dec. 17, 1907.

Application filed June 3, 1902. Serial No. 110,015.

*To all whom it may concern:*

Be it known that I, HARVEY L. FISHER, a citizen of the United States, residing at the city of Chicago, in the county of Cook and State of Illinois, have invented certain new and useful Improvements in Adding Attachments for Type-Writing Machines, of which the following is a description, reference being had to the drawings forming part of this specification.

My invention has for its object the provision of a simple and efficient adding attachment for typewriting machines, for adding together or totalizing the amounts printed upon the paper in the typewriting machine, and its novelty will be hereinafter set forth and particularly pointed out in my claims.

In the accompanying drawings Figure 1 is a perspective view of a typewriting machine embodying my invention looking at the left hand forward corner of the machine; Fig. 2 a longitudinal vertical section of the machine at the right of the adding attachment, and approximately on the line 2—2 of Fig. 3, and with the front end of the machine broken away; Fig. 3 a sectional front elevation of the machine approximately on the line 3—3 of Fig. 2, showing more particularly the mechanism within the casing of the adding attachment and omitting other parts of the machine not connected therewith; Fig. 3ª a detail of the wheel-resetting devices; Fig. 4 a front elevation of the paper-carriage of the machine, being a sectional view approximately on the line 4—4 of Fig. 2; Fig. 5 a detail perspective view of part of the front side of the paper-carriage, and one of the rack-plates carried thereby, and the pinion with which said rack-plate coöperates; Fig. 6 a sectional detail of one of the rack-plates and the front bar of the paper-carriage upon which it is mounted; Figs. 7, 8 and 9 enlarged side elevations of the right side of the adding attachment, with its casing in section or partially broken away, and showing the parts in three different positions, at successive stages in the adding operation; Fig. 10 a top plan view of the paper-carriage and the rear portion of the machine, showing the stop devices controlled by the tabulator keys for raising the paper carriage in desired denominational positions; Fig. 11 a detail of the connection for turning the rockshaft which carries the stops; Fig. 12 a perspective detail of the rear side of said shaft, with one of the stops thereon, and the graduated contact-piece carried by the paper-carriage and coöperating with the stop; and Figs. 13, 14 and 15 sectional details showing the means for holding the stops in different adjusted positions upon the rockshaft.

The same letters of reference refer to identical parts in the several views.

My invention is applicable to a wide variety of type-writing machines, and for convenience of illustration I have selected the machine heretofore invented and constructed by me and illustrated and described in my several pending applications for Letters Patent No. 693,442 filed October 13, 1898; No. 706,481 filed February 23, 1899; No. 721,551 filed June 23, 1899; and No. 56,923 filed April 22, 1901. The general construction and mode of operation of said machine are explained in detail in said pending applications, and only such description will therefore be given here as may be necessary to a clear understanding of my present invention.

The regular key levers 1 of the machine are fulcrumed at their rear ends at 2; Fig. 2, and are connected by links 3 to type-bars 4 having pivotal bearings at their lower ends in plates 5 mounted upon the framework, and carrying at their outer ends the usual types adapted to strike upon the upper forward side of the platen roller 6. Said roller is mounted in a paper-carriage frame 7 supported at its forward side by a roller 8 resting and traveling upon the upper edge of a transverse bar 9 connecting the opposite sides of the main framework of the machine. The rear side of the paper-carriage frame has secured in it a transverse rod 10 which rests and travels upon grooved rollers 11 mounted in bearings at the opposite sides of the main frame, Figs. 1, 4 and 10, and upon additional similar rollers 12 mounted in bearings 13 between the outer rollers 11 11, Fig. 2. The paper-carriage is thus free to travel transversely of the machine upon the rollers 11 12 at its rear side and the track-rail or frame-bar 9 at its forward side. A metal strap 14, Fig. 10, secured at its right hand end to the paper-carriage frame, and at its left hand end secured to and wound upon a spring drum 15, serves, under the action of said spring drum, to pull the paper-carriage toward the left, and to move it in that direction when permitted by the escapement mechanism.

Secured to the under side of the paper-carriage frame 7 at its rear edge is a rack-bar 16, Figs. 2 and 10, which meshes with a pinion 17 fast upon a vertical shaft or spindle mounted in a suitable bearing 18 upon the framework and having secured to its lower end an escapement wheel 19 provided with vertically depending teeth. As the paper-carriage is moved toward the left, under the operations of the keys and space-bar, the pinion 17 and wheel 19 are turned in one direction, and when it is returned to right hand position, preparatory to beginning a new line, they are turned in the opposite direction.

The escapement mechanism of which the wheel 19 forms a part may be the same as that illustrated and described in my aforesaid pending application No. 706,481, and it will here suffice, for an understanding of my present invention, to say that the escapement dog which coöperates with the wheel 19 is actuated by an arm 20 fast upon a rock-shaft 21 which has fastened to it, at opposite sides of the machine, forwardly projecting arms 22 whose front ends are connected by the universal bar 23 underlying the key-levers 1, so that whenever any one of said levers is depressed the shaft 21 will be rocked and operate the escapement mechanism and permit the paper-carriage to move one step toward the left. A coiled spring 24 connected to the escapement dog serves to return said dog to normal position when the operated key-lever is released.

Coming now to an explanation of my present invention, the adding mechanism of my novel attachment is preferably located at the front of the machine and inclosed within a suitable casing 46, Fig. 1, provided in its upper portion with a transversely extending slot or sight opening 47 through which the numbers upon the adding wheels 48 are exposed to view. There are in the present instance two sets of these adding wheels, A and B, Fig. 3, mounted upon a shaft 49 in the upper part of the casing 46; but the number of sets of wheels may be increased as desired, as hereinafter explained. Each set in the present instance contains ten wheels, representing, respectively, units and tens of cents, and units, tens, hundreds, thousands, tens of thousands, hundreds of thousands, millions and tens of millions of dollars, and has an aggregate adding capacity of $99,999,999.99; but the number of wheels in each set, and its consequent adding capacity, may likewise be increased or decreased as desired. In the present instance only nine wheels in each set are directly actuated by the operating keys, the tenth or left hand wheel being merely a cumulating wheel.

Each of the adding wheels 48 has fast upon its side a pinion 50 meshing with a gear wheel 51 mounted upon a shaft 52 supported in the casing 46 beneath the shaft 49, Figs. 2, 3, 7, 8 and 9. Mounted upon the shaft 52 beside each gear wheel 51 is a pawl-carrying lever 53 carrying at its lower end a pawl 54 engaging the teeth of the wheel. Pivoted to the upper end of the pawl-carrier 53 and depending therefrom is a link 55 provided at its lower end with a laterally projecting stud 56, Fig. 7, extending through a grooved slot 57 in a guide-plate 58 secured to the rear face of the front wall of the casing 46. A spring 59 connected to the lower end of the link 55 pulls the latter upward and forward and yieldingly holds the parts in normal position, with the stud 56 in the upper end of the slot 57. When the link 55 is drawn downwards, in the manner hereinafter explained, the pawl-carrier 53 will be rocked upon the shaft 52 and the pawl 54 caused to advance the gear-wheel 51 and connected adding wheel 48 a distance proportionate to the movement given the link 55, and when the latter is released the spring 59 will restore the parts to normal position.

The link 55 is provided in the rear edge of its lower end with a recess 60, Fig. 7, adapted to coöperate with a finger 61 projecting forwardly from a thin arm or plate 62 which constitutes an actuating device common to the links 55 of all of the adding wheels in the machine, and adapted to be advanced successively from one to another as hereinafter explained. This actuating device is loosely mounted at its lower end upon a rod 63 which connects the forward ends of a pair of arms 64 fast upon and projecting forwardly from a rock-shaft 65. The actuating device 62 is free to slide lengthwise along the rod 63, but whenever the rod is swung downward, by rocking the shaft 65, the actuating device will be carried downward with it.

The actuating device 62 is guided in such vertical movement, and is moved lengthwise of the rod 63, by a connection with a block 66 secured to a long rod or bar 67 movable lengthwise transversely of the machine, Fig. 3. The block 66 has projecting from its forward side an ear 68 which carries a stud bolt 69 secured in said ear by a nut 69$^a$ screwed upon its left hand end. The right hand end of the bolt is provided with a large flat head 69$^b$ between which and the ear 68 the actuating device 62 is guided, said device being provided with a longitudinal slot 70 through which the body of the bolt 69 passes. To further guide the actuating device 62 in its vertical movement, and to facilitate its free movement lengthwise along the shaft 63, the block 66 is provided with a depending curved plate 71 provided with a slot embracing the rear edge of the lower end of the actuating device 62, Figs. 3, 7, 8 and 9. This plate 71 is curved concentrically to the rock-shaft 65, so that the edge of the actuating device will be confined in the slot in the plate throughout the vertical movement of the parts.

As shown in Fig. 3, the bar 67 which moves the actuating device transversely of the machine is supported and guided at its right hand end by a grooved sheave 72 and at its left hand end in the side plate of the casing 46 and side frame of the main framework of the machine. It has a rack formed upon the upper side of its right hand portion, with which rack meshes a pinion 73 fast upon a shaft 74. As shown in Fig. 2, this shaft 74 is journaled at its forward end in the framework or casing and at its rear end in the frame-bar or track-rail 9 upon which the forward side of the paper-carriage rests and travels. Fast upon the rear end of this shaft 74 is a second pinion 75 adapted to be engaged and turned by rack-plates 76 mounted upon the forward side of the paper-carriage, Figs. 2, 4, 5 and 6. As the paper-carriage travels toward the left and one of the rackplates 76 engages the pinion 75 and turns it in the direction of the arrows in Figs. 4 and 5 the pinion 73 meshing with the rack-bar 67, Fig. 3, will be turned in the same direction and will move the said bar to the right with a step by step movement corresponding to the step by step movement of the paper-carriage toward the left, and thereby advance the actuating device 62 to position to actuate the adding wheels in succession. The pinion 73 is preferably larger than the pinion 75, so as to multiply the movement transmitted by the paper-carriage to the rack-bar 67 and actuating device 62, and thus cause them to move in steps of greater length than those of the paper-carriage itself and thus permit the use of adding wheels of greater width of face and spaced farther apart than would otherwise be possible.

The rack-plates 76 are adjustable transversely of the machine, along the forward side of the paper-carriage, and adapted to be locked thereto in their different adjusted positions, as hereafter described, and they may therefore be set to engage the pinion 75 at any desired points in the travel of the paper-carriage toward the left. The normal position of the parts of the adding device is shown in Fig. 3, with the rack-bar 67 in extreme left hand position, and the actuating device 62 at the left of the left hand set of adding wheels A and their depending actuating links 55. Inasmuch as the shaft 74 and pinion 73 are not turned, to move the rack-bar and actuating device toward the right, until in the movement of the paper-carriage toward the left, one of the rack-plates 76 engages the pinion 75 upon the rear end of the shaft 74, it will be understood that by setting the rack-plates 76 toward the right hand end of the paper-carriage the adder-actuating device may be permitted to remain at rest, in normal position, until the paper-carriage has completed a considerable portion of its movement toward the left, and that the exact points at which the adder-actuating devices are set in motion may be regulated as desired by adjustment of the rack-plates 76 upon the paper-carriage.

The rock-shaft 65 heretofore referred to, Figs. 2, 3, 7, 8 and 9, has secured to and depending from it, at opposite sides of the adding mechanism, Fig. 3, two arms 77 whose lower ends are connected by a transverse rod 78 adapted to coöperate with cams 79 formed upon or secured to the adder-actuating key-levers. These adder-actuating levers may consist of a series of special key-levers, supplemental to the regular key-levers of the typewriter, and operated only when it is desired to actuate the adding devices, in which case the rod 78 would be arranged to normally stand in the path of the cams 79 upon such levers, so as to be moved whenever any one of said levers was depressed; but a subordinate (though important) feature of my invention consists in the employment of the regular figure keys of the typewriter for actuating the adding devices when desired, and thus dispensing with the necessity of a supplemental series of special adding keys. To this end, under the construction and arrangement of the parts which I have illustrated, the cams 79 are secured to the key-levers 1 of the regular figure keys of the type-writer, and the rod 78 normally stands in front of and out of the path of movement of the cams 79 (being yieldingly held in that position by a spring 80) so that the key-levers and cams may be freely depressed (in ordinary typewriting) without affecting the rod 78 and the parts connected with it.

Projecting upward from the rock-shaft 65 is an arm 81 which carries at its upper end an anti-friction roller 82, which bears against the forward side of a collar 83 fast upon the shaft 74 heretofore referred to. A spring 84 pulls the arm 81 rearward and when the shaft 74 and collar 83 are in normal position, as in Figs. 2 and 7, the roller 82 rests in a notch 85 formed in the collar 83. Whenever the shaft 74 is turned from normal position the roller 82 will be forced out of the notch 85 in the collar 83, and the upper end of the arm 81 thrown forward. If the arm 81 were fast at its lower end upon the rock-shaft 65 it will be readily seen that this movement of the parts would rock said shaft and throw the parts carried by it into the position shown in Fig. 8; and the arm 81 may be made fast to the shaft 65 for this purpose, but I prefer to provide a loose connection between the arm and shaft, consisting of a short arm 86 fast upon the shaft and a lug 87 projecting from the side of the arm 81 immediately in rear of said arm 86. This connection of the arm 81 with the shaft 65 produces the same effect, upon the turning of the shaft 74 and its collar 83, as if the arm 81 were in fact directly fastened to the shaft 65, but it permits the rock-shaft and parts connected to it to be turned on farther in the same direction without carrying the arm 81 with them, and thus obviates idle movement of the arm 81 and the necessity for room to accommodate such movement.

It follows from the construction and arrangement of parts just described that whenever, in the movement of the paper-carriage toward the left, one of the rack-plates 76, Figs. 4 and 5, engages the pinion 75 upon the rear end of the shaft 74 the first movement imparted to said pinion and shaft will force the roller 82 of the arm 81 out of the notch 85 in the collar 83 upon said shaft and rock the shaft 65 and parts carried by it from the position shown in Figs. 2 and 7 to the position shown in Fig. 8; with the result that the rod 78 will be swung rearward into the path of the cams 79, while the rod 63 will be swung downward to a position which brings the finger 61 of the actuating device 62 into the horizontal plane of the notches 60 in the lower ends of the links 55, in which position the finger 61 is free to travel to the right through the notches 60 in all of the links 55, to actuate the latter in succession in the manner hereafter explained.

As shown in Fig. 3 and heretofore stated, in normal position the actuating device 62 stands at the left of the links 55 of all of the adding wheels, so that in its downward movement from its position shown in Fig. 7 to that shown in Fig. 8 it passes downward at the left side of the extreme left hand link in the series; but inasmuch as the same movement of the paper-carriage which produces the downward movement of the actuating device also carries it toward the right its finger 61 will by the same operation be brought into engagement with the notch 60 in said link. If the paper-carriage be then moved or permitted to move on further to the left without operating any adding key (i. e. any one of the key-levers provided with the cams 79) the adding device 62 will be simply moved to the right, step by step, with the paper-carriage, and its finger 61 will pass idly through the notches 60 in the successive links 55; but whenever any one of the adding keys is depressed its cam 79 will engage the rod 78 and rock the shaft 65 a distance proportionate to the pitch of the cam, with the result that the rod 63 and actuating device 62 will be swung downward a corresponding distance, carrying with them the particular link 55 with whose notch 60 the finger 61 is at the time engaged, and thereby actuate the corresponding adding wheel through the medium of the connected pawl-carrier 53, pawl 54 and gear-wheel 51. The finger 61 will remain locked in engagement with the link 55 at the end of the downward movement of the parts, but upon the release of the operated key-lever the escapement mechanism of the machine will permit the paper-carriage to advance one step toward the left, which movement will carry actuating device 62 one step toward the right and withdraw its finger 61 from engagement with the notch in the depressed link 55, thereby releasing the latter and permitting its spring 59 to restore it and the pawl-carrier and pawl to normal position. The same movement of the paper-carriage which withdraws the finger of the actuating device from engagement with the depressed link carries said finger to the right beneath and in line with the next succeeding link 55 in the series, and as the return of the operated key-lever permits the spring 80 to restore the parts to the position shown in Fig. 8 the finger 61, in the upward movement of the actuating device, will engage the beveled surface 88 of the link 55 beneath its notch 60 and force the lower end of the link rearward until the finger 61 clears such surface and comes opposite the notch 60, (a rearward extension of the upper end of the slot 57 in the guide plate 58 permitting such rearward movement of the lower end of the link 55,) whereupon the spring 59 will swing the lower end of the link 55 forward again and engage its notch with the finger 61. Upon now depressing another adding key the newly engaged link 55 will be carried downward by the finger of the actuating device and its connected adding wheel be turned a distance corresponding to the pitch of the cam 79 upon such key, and so on until all the wheels in the set have been actuated.

It will be understood that the cams 79 upon the adding keys are varied in pitch, to produce differential movements of the adding devices from 1 to 9; and to prevent overthrow or excess movement of the rod 78 and parts moved by it, due to any violent depression of an adding key, the cams terminate at their upper rear ends in slots 89 which fit the rod 78, so that at the end of the downward movement of the key-levers the rod is locked in the upper end of said slot, as shown in Fig. 9, and further movement of it prevented. Likewise the notch-and-finger engagement of the actuating device with the links 55, which causes the actuating device to remain in locked engagement with the link from the beginning to the end of its movement, prevents any overthrow or excessive movement of the link and pawl-carrier and pawl which might otherwise occur. These are details of construction, however, which are advantageous but not essential to the broader features of my invention, without departing from which they may be changed or omitted, or different mechanisms intermediate the adding keys and adding wheels be substituted for that which I have illustrated and described.

As will be understood from the foregoing description, the initial movement imparted to the shaft 74 by the rack-plate upon the paper-carriage throws the adding devices into operative position or condition, after which the successive depression of the adding keys will cause the amounts represented by said keys to be added upon the several wheels of the adding device. If an adding key be depressed immediately after the parts are thus thrown into operative condition (without further movement of the paper-carriage toward the left and consequent movement of the adder-actuating device toward the right) the amount represented by such key will be added upon the adding wheel operated by the extreme left hand link 55, which in the present instance operates the adding wheel representing millions of dollars; but by moving the carriage on to the left, without first operating any adding key, the actuating device may be brought into position to actuate the adding wheel of any lower denomination at the first operation of an adding key, and thereafter the adding wheels of still lower denominations will be actuated in succession, by successive depressions of adding keys, in the manner before explained.

The paper-carriage may be moved to position to print in the desired denominational column on the paper, (and the adder-actuating device be coincidently moved to position to actuate the adding wheel of corresponding denomination at the first depression of an adding key,) by spacing the carriage along with the usual spacing bar, or by moving it directly by hand to such position; but an important feature of my invention consists in the combination of a tabulating mechanism with the adding devices, in such a manner that upon operating the tabulating mechanism the paper-carriage will be advanced to position to begin the printing in the desired denominational column upon the paper, and the adder-actuating device be simultaneously moved to position to actuate the adding wheel of corresponding denomination, so that upon then depressing an adding key, without any further preparation or manipulation, the value of such key will be printed in the proper denominational column upon the paper and added upon the adding wheel. A further important feature of my invention in this respect is the employment of a tabulating mechanism embodying adjustable stop devices whereby if a single column of figures is to be printed upon the paper the position of such column may be determined as desired by the adjustment of such devices, and whereby if a plurality of columns of figures is to be printed upon the paper the positions of all of said columns may be determined independently of each other by the adjustment of said devices; and the combination of such a tabulating mechanism with the adding mechanism in such manner and by such means that if a single column of figures is to be printed it may be printed in any desired position upon the paper and the several amounts be nevertheless added upon the adding wheels, and that if a plurality of columns of figures is to be printed the several amounts in each column may be added upon the corresponding set of adding wheels regardless of the positions of the columns upon the paper. I accomplish these desirable results by the employment of the adjustable rack-plates 76 for turning the shaft 74, and their combination, through the medium of the paper-carriage, with a tabulating mechanism such as described, embodying stop devices for determining the positions of the columns to be printed upon the paper which may be adjusted in coördination with the adjustable rack-plates upon the paper-carriage, so that by adjusting said stop devices and rack-plates in correspondence with each other a single column of figures may be printed in any desired position upon the paper and the several amounts therein be added upon the adding wheels, or a plurality of columns of figures be printed in any desired relative position upon the paper and the amounts in the several columns be added upon the corresponding sets of adding wheels.

As shown in Figs. 2, 4, 5 and 6 the rack-plates 76 are hung upon and are adjustable lengthwise of a graduated bar 90 secured to the front of and extending longitudinally along the paper carriage frame 7. The plates 76 are in the present instance composed of vertical front portions, horizontal top portions, and rear depending flanges 91 extending downward behind the bar 90, and are provided at their upper edges with thumb-pieces 92 by which they may be rocked upon the upper edge of the bar 90. Their top portions are confined in a guideway 90$^a$ formed between the upper edge of the bar 90 and the depending edge of a curved plate 93 also secured to the front side of the paper-carriage frame 7, the plate 93 and bar 90 being spaced apart by posts 94 to the front ends of which the bar 90 is secured, Figs. 2 and 5. A curved spring 95 is confined between the upper edge of the bar 90 and the top of each of the rack-plates, and serves to press the latter backward and hold its top against the edge of the plate 93. The lower edge of the bar 90 is provided with notches or teeth, corresponding to those of the paper-carriage escapement-rack 16, Fig. 10, and adapted to be engaged by corresponding notches or teeth upon the upper edge of a locking plate 96 secured to the inner face of the rack-plate 76 near its lower edge, Figs. 2, 5 and 6, and in the present instance the lower edge of said locking plate 96 is provided with rack-teeth coincident with those upon the lower edge of the plate 76, so that it constitutes with the latter a rack of double width to coöperate with the pinion 75.

Under the above described construction the rack-plates 76 may be readily adjusted lengthwise of the bar 90 and locked thereto in their different adjusted positions. The coöperation of the spring 95 and the edge of the curved plate 93 with the horizontal top of the rack-plate 76 serves to yieldingly hold the latter in either its inner or outer position, so that when swung outward, by pressing its thumb-piece 92 rearward, it will be yieldingly held in outer position and maintained out of coöperative relation with the pinion 75, and when it is swung inward it will likewise be maintained in its inner position and securely locked to the bar 90, ready to coöperate with the pinion 75.

By adjusting the rack-plate 76 along the bar 90 to positions corresponding to those in which the stops of the tabulator mechanism (hereinafter described) may be set, the rack-plate 76 may be caused to coöperate with the pinion 75 in such a manner that the operation of the tabular mechanism will not only serve to advance the paper-carriage to position to print in the desired denominational column, but will throw the adding devices into operative position or condition, and advance the adder-actuating device to position to actuate the adding wheel of corresponding denomination. Thus, assuming for purposes of illustration that it be desired to print two columns of figures upon the paper—the first with its figure of highest denomination at the space 42, and the second with its highest figure at the space 62—and add the amounts printed in the two columns upon the two sets of adding wheels shown: The two rack-plates 76 will be adjusted upon the bar 90 to the graduations 42 and 62, as shown in Fig. 4, and locked thereto in the manner described. The first stop of the tabulating mechanism will be likewise adjusted to arrest the paper carriage in position to print the figure of highest denomination in the first column at the space 42 and the second stop will be adjusted to cause the highest figure in the second column to be printed at the space 62, as shown in Fig. 10 and hereinafter described.

In Figs. 4 and 10 the paper-carriage is shown in about middle position, so that if a type-key were operated it would print at the space 40 upon the paper. To cause the figure of highest denomination in the first column to be printed at the space 42, therefore, the paper-carriage must be moved two spaces to the left, and upon moving it two spaces to the left the first rack-plate 76 will be carried from the position shown in Fig. 4 to that shown in Fig. 5 and caused to engage the pinion 75 and turn it to the position shown in the latter figure. To facilitate this initial engagement of the rack and pinion the latter is provided with a tooth c of extra size which normally stands in vertical position in the path of the rack-plate. The turning of the pinion, and consequently of the shaft 74, to the position shown in Fig. 5, will, as heretofore explained, serve to force the roller 82 of the arm 81 out of the notch 85 of the collar 83 upon the shaft 74, Figs. 2, 7 and 8, and throw the adder actuating devices from the position shown in Fig. 7 to that shown in Fig. 8. If the paper-carriage be arrested at the space 42 by the tabulator stop (as it will be if the tabulator key of highest denomination be operated) the adder-actuating device will be thereby set to position to actuate the adding wheel of highest denomination in the first set (i. e. highest with the exception of the accumulating wheel at the extreme left of said set) and upon then depressing any one of the adding keys the amount represented by it will be added on such wheel and be printed upon the paper at the space 42; and upon successive depressions of the adding keys the paper-carriage will be advanced step by step toward the left and the rack-plate 76, meshing with the pinion 75 will advance the rack-bar 67 and adder-actuating device 62 step by step toward the right, so that as each succeeding adding key is depressed the amount represented by it will be printed in the corresponding denominational column and added upon the adding wheel of the same denomination. If, however, the first tabulator key depressed be one of intermediate denomination the paper-carriage will be permitted to travel further toward the left than indicated in Fig. 5, before being arrested by the tabulator stop, and the rack-plate 76 will come into mesh with the regular teeth of the pinion 75 and turn the same and the shaft 74 far enough to carry the actuating device to the right into position to actuate the adding wheel of corresponding denomination at the first depression of an adding key. So, if the tabulator key representing the decimal point be the one depressed the paper-carriage will move to the left to position for printing the decimal point in the column of figures, and the rack-plate 76 will turn the pinion 75 and the shaft 74 far enough to bring the adder-actuating device 62 into the space between the links 55 of the units of dollars adding wheel and the tens of cents adding wheel, Fig. 3, so that upon then operating the type key representing the decimal point or period, to print the decimal point in the column of figures, the adder-actuating device will be simply advanced one step further toward the right and engaged with the link 55 of the tens of cents adding wheel, ready to actuate that wheel upon the depression of the next adding key. This will still leave the rack-plate 76 in mesh with the pinion 75, and in such position relative thereto that it will not pass beyond and become disengaged from the pinion until after the units of cents amount has also been printed and added. The complete revolution of the pinion by the rack-plate will bring the pinion tooth c into vertical position again behind or to the right of the rack-plate, and the notch 85 in the collar 83 upon the shaft 74 will be simultaneously brought opposite the roller 82 upon the arm 81 again, and the springs 80 and 84 will restore the parts to the position shown in Figs. 2 and 7. This completes the printing of an amount in the first column and the adding of it upon the adding wheels of the first set, and the parts come to rest with the adding mechanism out of coöperative relation with the figure keys of the typewriter and they remain out of coöperative relation with each other until the paper-carriage is moved onward to the left far enough to bring the second or right hand rack-plate 76 into engagement with the pinion 75, whereupon the adding devices will be again thrown into coöperative relation with the figure keys of the typewriter, ready for an amount to be printed in the second column of figures and added upon the second set of adding wheels.

Upon returning the paper-carriage to right hand position each of the racks 76 will turn the pinion 75 backward a complete revolution, which will serve to return the rack-bar 67 and adder-actuating device to extreme left hand or normal position.

Any known or suitable tabulating mechanism employing adjustable stop devices for the paper-carriage may be employed in combination with my novel adding devices and coöperate therewith in the manner and for the purpose and with the results above described. For purposes of convenience, and because actually employed by me, I have chosen for illustration in the accompanying drawings the tabulating mechanism covered by my pending application No. 56,923, which for the purposes of the present case may be described as follows: The construction of the escapement mechanism of the machine illustrated in the drawings is such, as fully explained in my aforesaid pending application No. 706,481, that if the arm 20 which actuates the escapement dog (Fig. 2) be given an abnormal forward movement the escapement dog operated by said arm will be carried inside of and entirely out of engagement with the escapement wheel 19, and the paper-carriage be thereby released and permitted to move toward the left until arrested by the stop devices of the tabulating mechanism hereinafter described. The means provided for giving the arm 20 such extreme forward movement consists of the tabulator keys 25, which are fulcrumed at their rear ends at 26 and at their forward ends have connected to them the lower ends of vertical rods or stems 27 which carry at their upper ends the finger-buttons 28 bearing numbers and characters indicating the denominational values of the respective levers. Each of said levers is provided, toward its rear end, with an upwardly extending hooked arm 29 adapted to engage a cross-rod 29ª connecting the side arms 22 of the universal bar 23 which operates the escapement mechanism as before described, and the adjustment of the parts is such that whenever any one of the tabulator levers 25 is depressed to its limit of movement its hooked arm 29 will swing the frame composed of the side arms 22 and universal bar 23 a considerable distance further than it is depressed by the operations of the regular type-levers 1, with the result that the upper end of the arm 20 will be thrown forward beyond its normal limit of movement and the escapement dog be thereby entirely disengaged from the wheel 19, so that the paper-carriage will be wholly released and left free to be drawn to the left by its spring as before explained.

Secured to the upper rear side of the paper-carriage frame 7, near its middle, and projecting rearwardly therefrom is a bracket-plate 30, which in the present instance carries at its upper rear end a trip for the striker of the alarm bell 31, Figs. 2 and 10. Secured to the upper side of this bracket-plate 30 is a graduated contact-piece 32 adapted to coöperate with stops 33 mounted upon and adjustable longitudinally of a rock-shaft 34 which is mounted at its opposite ends in bearings upon the framework and surrounded at its right hand end, Fig. 10, with a coiled spring 34ª connected at one end to the shaft and at its opposite end to the framework, which spring serves to yieldingly hold the shaft in and return it to normal position. The graduated contact-piece 32 is curved in cross section concentrically to the rock-shaft 34, Fig. 2, and is provided upon its left hand side or edge with a series of steps or shoulders a arranged in retreating order from left to right and from front to rear, Fig. 10, and forming a series of contact surfaces separated from each other by the length of a regular letter-space movement of the paper-carriage. These steps or shoulders a correspond in number to the tabulator key-levers 25 and are adapted to coöperate with the stops 33 upon the rock-shaft 34. When said shaft is in normal position the stops 33 stand above the plane of and out of the path of movement of the contact piece 32, as shown in Fig. 2, so that the paper-carriage is free to be moved in either direction without regard to said stops. When, however, the shaft 34 is turned a greater or less distance in the direction of the arrow in Fig. 2 its stops 33 will be carried into line with one or another of the shoulders a upon the contact piece 32, so that if the paper-carriage be then permitted to move toward the left it will be arrested by the contact of the piece 32 with the first stop 33 standing in its path. The several tabulator key-levers 25 are arranged to coöperate with the rock-shaft 34 in such manner as to turn the latter different degrees of distance according to the different denominational values of such levers, with the result that when any given lever is operated the shaft will be turned to a point to bring the stops 33 into line with the corresponding shoulder or contact surface $a$ upon the contact piece 32. If the rock-shaft 34 be turned just far enough to carry the stops 33 into line with the right hand and rearmost shoulder or contact surface $a$ the paper-carriage will be permitted a maximum movement to the left before being arrested by the first stop standing in the path of said contact piece; while if the shaft is turned so as to carry the stops 33 into the path of some one of the shoulders $a$ at the left of the one mentioned the paper-carriage will be arrested at an earlier point in its movement toward the left. There are in the present instance, as shown in Fig. 1, eight tabulator keys, which may be taken to represent, respectively, a decimal point or period and different denominations of value from units to millions, reading in regular order from right to left; and the graduated contact piece 32 is provided with eight stops or shoulders $a$ corresponding in relative position or order with the eight tabulator keys.

As will be understood from the foregoing explanation, whenever any one of the tabulator keys is operated the rock-shaft 34 will be so turned as to carry the stops 33 into line with the corresponding shoulder $a$ upon the graduated contact piece 32, and inasmuch as the operation of such tabulator key will also serve (as before explained) to disengage the escapement mechanism and release the paper carriage, the result will be that the latter will be drawn to the left by its spring until arrested by contact of one of the stops 33 with the shoulder $a$ into line with which the stops 33 have been carried, which shoulder $a$ will be the one corresponding to the particular tabulator key which had been operated, and the paper-carriage will consequently be arrested at a point for printing to be effected in the denominational column of figures corresponding to the tabulator key which has been operated.

In the present instance the connections between the tabulator key-levers 25 and the rock-shaft 34 for causing the operations of the different keys to turn the shaft different degrees proportionate to the denominational values or positions of the keys are as follows (Fig. 2): A rock-shaft 35 journaled at its opposite ends in bearings upon the framework is provided upon its under side with a depending plate or wing 36 whose lower edge is inclined upwardly from the right toward the left of the machine and adapted to coöperate with a series of graduated cams 37 formed upon the upwardly extending rear ends 38 of the tabulator key-levers 25. It follows from this construction that the operations of the different levers will impart different degrees of movement to the rock-shaft 35, and the construction and adjustment of the parts are such that the movement thus given the shaft by the operation of each tabulator key will correspond to the denominational value or position of such key. The shaft 35 has secured upon its right hand end, Fig. 2, a vertically extending arm 39 whose upper end is connected by a link 40 with an arm 41 fast upon and projecting forwardly from the rock-shaft 34, Figs. 2 and 11. When the shaft 35 is rocked by the operation of any tabulator key the upper end of the arm 39 carried by said shaft will be swung rearward, and, through the medium of the link 40 and arm 41, will turn the shaft 34 in the direction of the arrow in Fig. 2 and swing the stops 33 downward and forward into line with the shoulder or contact surface $a$ on the contact piece 32 which corresponds to the operated tabulator key, with the result that the paper-carriage, as it moves toward the left, will be arrested in position for the printing to be effected in the corresponding denominational column.

The stops 33 are adjustable longitudinally of the rock-shaft 34, and the latter is provided with a suitable scale, Fig. 10, so that they may be set to cause the printing to be effected in columns located in any desired position transversely of the sheet of paper. Two of the stops 33 are shown upon the rock-shaft 34, by the adjustment of which longitudinally of the shaft the positions of the columns to be printed are determined. In the present instance the means for readily adjusting the stops lengthwise of the shaft and securing them thereto in adjusted position are shown in Figs. 12, 13, 14 and 15, where it will be seen that the rock-shaft 34 is provided upon its rear side with a longitudinal groove $a'$ whose lower wall is formed into or has secured to it a rack $b'$. The stops 33 project from disks 42 mounted upon the shaft 34 and formed integral with hubs or sleeves 43, Fig. 12. Each sleeve 43 has a screw $c'$ passed radially through it and projecting at its inner end into the groove $a'$ in the rock-shaft 34, Figs. 14 and 15. By turning the sleeve 43 in one direction upon the rock-shaft the inner end of the screw $c'$ may be engaged with the rack $b'$, Fig. 14, and thereby lock the sleeve from longitudinal movement on the shaft, while by turning the sleeve in the opposite direction the screw projection may be disengaged from the rack and carried into the free portion of the groove, as in Fig. 15, to permit the sleeve to be adjusted longitudinally along the shaft. The sleeves 43 are provided with milled collars or thumb pieces 44 for turning them, while a spring 45 shown in Fig. 13 serves to yieldingly hold the parts in normal position with the screw projection $c'$ engaged with the rack $b'$ in the rock-shaft, as in Fig. 14. When it is desired to adjust one of the stops longitudinally of the shaft the sleeve and parts secured to it are turned, against the resistance of the spring 45, until the inner end of the screw $c'$ is carried into the free portion of the groove in the rock-shaft, and after the stop has been then adjusted along the shaft to the desired position and released the spring will turn it back to normal position upon the shaft and reëngage the inner end of the screw $c'$ with the rack.

In Fig. 10 the two stops 33 are shown adjusted to positions 42 and 62 upon the rock-shaft, in correspondence with the adjustment of the rack-plates 76 shown in Fig. 4, so that when the tabulator key of highest denomination is operated the paper-carriage will be released and moved two spaces to the left and be then arrested by the first stop in position for the printing to be effected at the space 42 upon the paper; and this movement of the paper-carriage will have carried the first rack-plate 76 into engagement with the pinion 75 and turned the latter to the position shown in Fig. 5, and thereby thrown the adding mechanism and its operating keys into coöperative relation with each other, and advanced the actuating device 62 to position to actuate the proper adding wheel in the first set of wheels. After the desired amount has been printed in the first column upon the paper, and added upon the first set of adding wheels, the operation of a second tabulator key will advance the paper-carriage still further to the left and bring the second rack 76 into engagement with the pinion 75, thereby again throwing the adding mechanism and its operating keys into coöperative relation with each other and moving the actuating device 62 to position to actuate the adding wheel of the second set corresponding in denomination to the operated tabulator key.

Where it is desired to print and add more than two columns of figures additional sets of adding wheels may be provided and all be arranged to be actuated by the single actuating mechanism described, an additional rack-plate 76 and an additional tabulator stop 33 being employed for each additional set of adding wheels; as will be readily understood.

As will be understood from the foregoing description, a typewriter equipped with my invention may be employed with great facility and advantage in the making out of bills and invoices, or in other work where it is desired to write certain memoranda at the beginning of the line, and then carry out an amount, or a plurality of amounts, in a column or plurality of columns at the right hand end of the line, and add up such column or columns. With a machine equipped with my invention this is accomplished with the same facility that ordinary tabulated work (without addition) has heretofore been done on machines equipped with tabulating attachments, and in the same manner. That is to say, in order to both print and add up columns of figures on a machine equipped with my invention, it is simply necessary, after writing the desired memoranda at the beginning of the line, to press the proper tabulator key to advance the paper-carriage to the desired denominational position in a given column, and to then operate the figure or adding keys to print the desired amount in such column and simultaneously add it upon the corresponding set of adding wheels.

When it is desired to use the machine solely as a typewriter, and leave the adding mechanism entirely out of operation, it is simply necessary to throw the lower ends of the rack-plates 76 outward by pressing the thumb-pieces at their upper ends rearward, whereupon they will clear the pinion 75 during the movement of the paper-carriage in both directions and the adding mechanism be left entirely at rest. In such case the tabulator may be used independently of the adding mechanism.

In the present instance I have not only employed the regular figure keys of the typewriter for all purposes, but I have left the standard key-board of the machine unchanged, and utilized the letter l key for printing and adding units (providing it with a cam 79 for the latter purpose, Fig. 3) and the letter O key for printing ciphers. Should it be desired, however, to have all of the adding keys in a single row at the rear of the keyboard a units adding key may be added at the left hand end of the row and a cipher key at the right hand end, and the standard key-board be to this extent changed.

In the present instance I have shown the pinion 75 provided with ten teeth besides its large tooth $c$, and each rack-plate with eleven teeth, so that after the rack-plate has engaged said large tooth and turned the pinion far enough to throw the adding devices into operative position (Figs. 5 and 8) the engagement of the remaining teeth of the rack and pinion, as the rack moves on to the left, will move the adder-actuating device 62 eleven steps toward the right before the rack lets go of the pinion and completes its revolution. This will serve to not only disengage the device 62 from the right hand actuating link 55, but will move it two steps beyond such link before it comes to rest. This permits of a wider space being left between the right hand link 55 of the first or left hand set of adding wheels and the left hand link of the right hand set, and a consequent wider separation of the two sets of adding wheels, than if the rack and pinion had a less number of teeth. By increasing the size of the pinion and the number of teeth on it and the rack a still further separation of the two sets of adding wheels may be provided for if desired.

Under the particular arrangement of parts illustrated and described the adding wheels are directly actuated by the downward or positive strokes of the adding keys; but it will be understood that by reversing the positions of the actuating pawls 54 the adding wheels might be actuated at the return movement of the parts under the action of the springs 59, after the operated keys were released. Again, instead of actuating the adding wheels either directly and positively by the operating keys, or indirectly in the manner last described, the operating keys may be employed simply for the purpose of setting the actuating pawls and connected parts, and independent means—such as the return of the paper-carriage to right hand position or the operation of the line-spacing mechanism—be employed to return the pawls to initial position and actuate the adding wheels. Under either of the latter arrangements provision may readily be made for correcting errors before the amounts have been actually added upon the adding wheels; but where the adding wheels are actuated directly by the adding keys, as illustrated, provision for such correction may also be made by mounting the adding wheels upon the rod of a swinging bail, instead of upon the fixed shaft 49, so as to permit the adding wheels to be swung out of gear with the wheels 51 when it is desired to make corrections, such corrections being then readily made by inserting a pen or pencil or other instrument through the sight opening 47 and directly turning any of the adding wheels as required. Any suitable handle exterior to the casing and connected to such swinging bail may be employed for temporarily swinging the adding wheel out of mesh with the gears 51 to permit such corrections.

Any suitable transfer devices or carrying mechanism, for causing the complete revolution of each adding wheel to advance the next higher wheel one number, may be employed, that which I have illustrated in Figs. 2, 7, 8 and 9 consisting of transfer pawls 100 carried by levers 101 fulcrumed at their lower ends at 102 and having connected to their upper ends springs 103 tending to draw them forward against stops 104. The pawls 100 engage the gears 51 which mesh with the pinions 50 on the adding wheels 48, and each gear 51 is provided upon its left hand side with four equidistant lugs 105 adapted to coöperate with cam surfaces 106 upon the levers 101. There are ten teeth in each of the adding wheel pinions 50 and forty teeth in each of the gears 51, so that each quarter revolution of a gear 51 turns the corresponding adding wheel a complete revolution. The levers 101 are interposed between the adjacent gear wheels 51, and the cam surface 106 of each lever coöperates with the lugs 105 of the gear wheel at the right of the lever, while the pawl 100 carried by such lever engages the teeth of the gear wheel at the left of the lever, i. e. the next higher gear wheel in the series; and at each quarter revolution of the gear wheel at the right of the lever one of the lugs 105 on said gear wheel engages the cam surface 106 of the lever and forces it backward, and retracts the pawl 100 over the gear wheel at the left of the lever and causes it to engage a fresh tooth thereon, and the lug 105 then clears the cam surface 106 and permits the spring 103 to pull the upper end of the lever 101 forward against the stop 104, and thereby causes the pawl 100 to advance its gear wheel one tooth and the connected adding wheel one number, to effect the transfer.

For the purpose of returning the adding wheels to zero or initial position when desired, the shaft 49 upon which the wheels are mounted is provided with a longitudinal groove, shown in Fig. 3ª, adapted to coöperate with spring-pressed pawls 48ª carried by the adding wheels. The wheels are free to turn upon the shaft in the direction of the arrow in Fig. 3ª but when the shaft itself is turned in that direction its longitudinal groove will engage the pawls of all the wheels, in whatever position they may be, and thereby cause a complete revolution of the shaft to pick up all the adding wheels and turn them to zero. The shaft 49 is provided upon its left hand end with a milled thumb piece 49ª by which it may be turned for this purpose.

Having thus fully described my invention, I claim:

1. The combination of a movable paper-carriage, an adding mechanism mounted in fixed position relative to the transverse movement of the paper-carriage, operating keys therefor normally wholly out of coöperative relation therewith, and a tabulating mechanism controlling the movement of the paper-carriage and operable to bring the keys and adding mechanism into coöperative relation with each other.

2. The combination of a movable paper-carriage, an adding mechanism mounted in fixed position relative to the transverse movement of the paper-carriage, operating keys therefor normally wholly out of coöperative relation therewith, means operated by the movement of the paper-carriage to bring the keys and adding mechanism into coöperative relation with each other, and a tabulating mechanism controlling the movement of the paper-carriage.

3. The combination of a movable paper-carriage, an adding mechanism mounted in fixed position relative to the transverse movement of the paper carriage, operating keys therefor normally wholly out of coöperative relation therewith, adjustable means operated by the movement of the paper-carriage to bring the keys and adding mechanism into coöperative relation with each other at any desired point in the travel of the paper-carriage, and a tabulating mechanism controlling the movement of the paper-carriage.

4. The combination of a movable paper-carriage, the regular type-keys and printing devices of the typewriter, an adding mechanism adapted to be positively operated by certain of said keys but normally wholly out of coöperative relation therewith, and a tabulating mechanism controlling the movement of the paper-carriage and operable to bring said keys and adding mechanism into coöperative relation with each other.

5. The combination of the paper-carriage, the regular type keys and printing devices of the typewriter, an adding mechanism adapted to be positively operated by certain of said keys but normally wholly out of coöperative relation therewith, and means for automatically bringing such keys and the adding mechanism into coöperative relation with each other.

6. The combination of a movable paper-carriage, the regular type keys and printing devices of the typewriter, an adding mechanism adapted to be positively operated by certain of said keys but normally wholly out of coöperative relation therewith, and means operated by the movement of the paper-carriage for bringing such keys and the adding mechanism into coöperative relation with each other.

7. The combination of a movable paper-carriage, the regular type keys and printing devices of the typewriter, an adding mechanism adapted to be positively operated by certain of said keys but normally wholly out of coöperative relation therewith, and adjustable means operated by movement of the paper-carriage for bringing such keys and adding mechanism into coöperative relation with each other at any desired point in the travel of the paper-carriage.

8. The combination of a movable paper-carriage, the regular type keys and printing devices of the typewriter, an adding mechanism adapted to be positively operated by certain of said keys but normally wholly out of coöperative relation therewith, means operated by the movement of the paper-carriage for bringing such keys and adding mechanism into coöperative relation with each other, and a tabulating mechanism controlling the movement of the paper-carriage.

9. The combination of a movable paper-carriage, the regular type keys and printing devices of the typewriter, an adding mechanism adapted to be positively operated by certain of said keys but normally wholly out of coöperative relation therewith, adjustable means operated by the movement of the paper-carriage for bringing such keys and adding mechanism into coöperative relation with each other at any desired point in the travel of the paper-carriage, and a tabulating mechanism controlling the movement of the paper-carriage.

10. The combination of the paper-carriage, an adding mechanism mounted in fixed position upon the main frame of the machine, operating keys therefor normally wholly out of coöperative relation therewith, and means for automatically bringing the keys and adding mechanism into coöperative relation with each other.

11. The combination of a movable paper-carriage, an adding mechanism mounted in fixed position upon the main frame of the machine, operating keys therefor normally wholly out of coöperative relation therewith, and means operated by the movement of the paper-carriage to bring the keys and adding mechanism into coöperative relation with each other.

12. The combination of a movable paper-carriage, an adding mechanism mounted in fixed position upon the main frame of the machine, operating keys therefor normally wholly out of coöperative relation therewith, and adjustable means operated by the movement of the paper-carriage for bringing said keys and adding mechanism into coöperative relation with each other.

13. The combination of a movable paper-carriage, an adding mechanism mounted in fixed position upon the main frame of the machine, operating keys therefor normally wholly out of coöperative relation therewith, and a tabulating mechanism controlling the movement of the paper-carriage and operable to bring the keys and adding mechanism into coöperative relation with each other.

14. The combination of a movable paper-carriage, an adding mechanism mounted in fixed position upon the main frame of the machine, operating keys therefor normally wholly out of coöperative relation therewith, means operated by the movement of the paper-carriage for bringing said keys and adding mechanism into coöperative relation with each other, and a tabulating mechanism controlling the movement of the paper-carriage.

15. The combination of a movable paper-carriage, an adding mechanism mounted in fixed position upon the main frame of the machine, operating keys therefor normally wholly out of coöperative relation therewith, adjustable means operated by the movement of the paper-carriage for bringing said keys and adding mechanism into coöperative relation with each other at any desired point in the travel of the paper-carriage, and a tabulating mechanism controlling the movement of the paper-carriage.

16. The combination of a movable paper-carriage, the regular type keys and printing devices of the typewriter, an adding mechanism mounted in fixed position upon the main frame of the machine and adapted to be operated by certain of said keys but normally wholly out of coöperative relation therewith, and a tabulating mechanism controlling the movement of the paper-carriage and operable to bring such keys and adding mechanism into coöperative relation with each other.

17. The combination of a movable paper-carriage, the regular type keys and printing devices of the typewriter, an adding mechanism mounted in fixed position upon the main frame of the machine and adapted to be operated by certain of said keys but normally wholly out of coöperative relation therewith, and means operated by the movement of the paper-carriage for bringing such keys and adding mechanism into coöperative relation with each other.

18. The combination of a movable paper-carriage, the regular type keys and printing devices of the typewriter, an adding mechanism mounted in fixed position upon the main frame of the machine and adapted to be operated by certain of said keys but normally wholly out of coöperative relation therewith, and adjustable means operated by the movement of the paper-carriage for bringing such keys and adding mechanism into coöperative relation with each other at any desired point in the travel of the paper-carriage.

19. The combination of a movable paper-carriage, the regular type keys and printing devices of the typewriter, an adding mechanism mounted in fixed position upon the main frame of the machine and adapted to be operated by certain of said keys but normally wholly out of coöperative relation therewith, means operated by the movement of the paper-carriage for bringing such keys and adding mechanism into coöperative relation with each other, and a tabulating mechanism controlling the movement of the paper-carriage.

20. The combination of a movable paper-carriage, the regular type keys and printing devices of the typewriter, an adding mechanism mounted in fixed position upon the main frame of the machine and adapted to be operated by certain of said keys but normally wholly out of coöperative relation therewith, adjustable means operated by the movement of the paper-carriage for bringing such keys and adding mechanism into coöperative relation with each other at any desired point in the travel of the paper-carriage, and a tabulating mechanism controlling the movement of the paper-carriage.

21. The combination of a movable paper-carriage, a plurality of adding wheels mounted in fixed position relative to the transverse movement of the paper-carriage, a single actuating device common to said adding wheels normally unaffected by the transverse movement of the paper-carriage, and adjustable means for automatically connecting the actuating device and paper-carriage at any desired point in the travel of the latter and causing the further movement of the paper-carriage to advance the actuating device from one adding wheel to another.

22. The combination of a movable paper-carriage, a plurality of adding wheels mounted in fixed position relative to the transverse movement of the paper-carriage, a single actuating device common to the adding wheels normally unaffected by the transverse movement of the paper-carriage, adjustable means intermediate said device and the paper-carriage for connecting the two at any desired point in the travel of the paper-carriage, and means for releasing the paper-carriage and arresting it at any predetermined point in its movement.

23. The combination of a movable paper-carriage, a plurality of adding wheels mounted in fixed position relative to the transverse movement of the paper-carriage, a single actuating device common to said wheels normally unaffected by the transverse movement of the paper-carriage, adjustable means intermediate said device and the paper-carriage for connecting the two at any desired point in the travel of the carriage, a plurality of tabulator keys representing different denominations of value, and means operated thereby and coöperating with the paper-carriage to release the carriage and arrest it at any desired denominational position and cause it to move the actuating device to corresponding position relative to the adding wheels.

24. The combination of the paper-carriage, the operating keys and printing devices, the adding mechanism, an actuating device therefor adapted to be positively operated by the keys but normally out of coöperative relation with the keys, and means for bringing said keys and actuating device into coöperative relation with each other.

25. The combination of a movable paper-carriage, the operating keys and printing devices, the adding mechanism, an actuating device therefor adapted to be positively operated by the keys but normally out of coöperative relation with the keys, and means for automatically bringing said keys and actuating device into coöperative relation with each other during the movement of the paper-carriage.

26. The combination of a movable paper-carriage, the operating keys and printing devices, the adding mechanism, an actuating device therefor adapted to be positively operated by the keys but normally out of coöperative relation with the keys, and adjustable means for automatically bringing said keys and actuating device into coöperative relation with each other at any desired point in the movement of the paper-carriage.

27. The combination of a movable paper-carriage, the operating keys and printing devices, the adding mechanism, an actuating device therefor adapted to be positively operated by the keys but normally out of coöperative relation with the keys, and means operated by the movement of the paper-carriage for bringing said keys and actuating device into coöperative relation with each other.

28. The combination of a movable paper-carriage, the operating keys and printing devices, the adding mechanism, an actuating device therefor adapted to be positively operated by the keys but normally out of coöperative relation with the keys, and adjustable means operated by the movement of the paper-carriage for bringing said keys and actuating device into coöperative relation with each other at any desired point in the movement of the paper-carriage.

29. The combination of the paper-carriage, the regular type keys and printing devices of the typewriter, the adding mechanism, an actuating device therefor adapted to be positively operated by certain of said keys but normally out of coöperative relation with the keys, and means for bringing said keys and actuating device into coöperative relation with each other.

30. The combination of a movable paper-carriage, the regular type keys and printing devices of the typewriter, the adding mechanism, an actuating device therefor adapted to be positively operated by certain of said keys but normally out of coöperative relation with the keys, and means for automatically bringing said keys and actuating device into coöperative relation with each other during the movement of the paper-carriage.

31. The combination of a movable paper-carriage, the regular type keys and printing devices of the typewriter, the adding mechanism, an actuating device therefor adapted to be positively operated by certain of said keys but normally out of coöperative relation with the keys, and adjustable means for automatically bringing said keys and actuating device into coöperative relation with each other at any desired point in the movement of the paper-carriage.

32. The combination of a movable paper-carriage, the regular type keys and printing devices of the typewriter, the adding mechanism, an actuating device therefor adapted to be positively operated by certain of said keys but normally out of coöperative relation with the keys, and means operated by the movement of the paper-carriage for bringing said keys and actuating device into coöperative relation with each other.

33. The combination of a movable paper-carriage, the regular type keys and printing devices of the typewriter, the adding mechanism, an actuating device therefor adapted to be positively operated by certain of said keys but normally out of coöperative relation with the keys, and adjustable means operated by the movement of the paper-carriage for bringing said keys and actuating device into coöperative relation with each other at any desired point in the movement of the paper-carriage.

34. The combination of a movable paper-carriage, the operating keys and printing devices, the adding mechanism, an actuating device therefor adapted to be positively operated by the keys but normally out of coöperative relation with the keys, means for bringing said keys and actuating device into coöperative relation with each other, and a tabulating mechanism controlling the movement of the paper-carriage.

35. The combination of a movable paper-carriage, the operating keys and printing devices, the adding mechanism, an actuating device therefor adapted to be positively operated by the keys but normally out of coöperative relation with the keys, means for automatically bringing said keys and actuating device into coöperative relation with each other during the movement of the paper-carriage, and a tabulating mechanism controlling the movement of the paper-carriage.

36. The combination of a movable paper-carriage, the operating keys and printing devices, the adding mechanism, an actuating device therefor adapted to be positively operated by the keys but normally out of coöperative relation with the keys, adjustable means for automatically bringing said keys and actuating device into coöperative relation with each other at any desired point in the movement of the paper-carriage, and a tabulating mechanism controlling the movement of the paper-carriage.

37. The combination of a movable paper-carriage, the operating keys and printing devices, the adding mechanism, an actuating device therefor adapted to be positively operated by the keys but normally out of coöperative relation with the keys, means operated by the movement of the paper-carriage for bringing said keys and actuating device into coöperative relation with each other, and a tabulating mechanism controlling the movement of the paper-carriage.

38. The combination of a movable paper-carriage, the operating keys and printing devices, the adding mechanism, an actuating device therefor adapted to be positively operated by the keys but normally out of coöperative relation with the keys, adjustable means operated by the movement of the paper-carriage for bringing said keys and actuating device into coöperative relation with each other at any desired point in the movement of the paper-carriage, and a tabulating mechanism controlling the movement of the paper-carriage.

39. The combination of a movable paper-carriage, the regular type keys and printing devices of the typewriter, the adding mechanism, an actuating device therefor adapted to be positively operated by certain of said keys but normally out of coöperative relation with the keys, means for bringing said keys and actuating device into coöperative relation with each other, and a tabulating mechanism controlling the movement of the paper-carriage.

40. The combination of a movable paper-carriage, the regular type keys and printing devices of the typewriter, the adding mechanism, an actuating device therefor adapted to be positively operated by certain of said keys but normally out of coöperative relation with the keys, means for automatically bringing said keys and actuating device into coöperative relation with each other during the movement of the paper-carriage, and a tabulating mechanism controlling the movement of the paper-carriage.

41. The combination of a movable paper-carriage, the regular type keys and printing devices of the typewriter, the adding mechanism, an actuating device therefor adapted to be positively operated by certain of said keys but normally out of coöperative relation with the keys, adjustable means for automatically bringing said keys and actuating device into coöperative relation with each other at any desired point in the movement of the paper-carriage, and a tabulating mechanism controlling the movement of the paper-carriage.

42. The combination of a movable paper-carriage, the regular type keys and printing devices of the typewriter, the adding mechanism, an actuating device therefor adapted to be positively operated by certain of said keys but normally out of coöperative relation with the keys, means operated by the movement of the paper-carriage for bringing said keys and actuating device into coöperative relation with each other, and a tabulating mechanism controlling the movement of the paper-carriage.

43. The combination of a movable paper-carriage, the regular type keys and printing devices of the typewriter, the adding mechanism, an actuating device therefor adapted to be positively operated by certain of said keys but normally out of coöperative relation with the keys, adjustable means operated by the movement of the paper-carriage for bringing said keys and actuating device into coöperative relation with each other at any desired point in the movement of the paper-carriage, and a tabulating mechanism controlling the movement of the paper-carriage.

44. The combination of a movable paper-carriage, the operating keys and printing devices, a plurality of adding wheels mounted in fixed position relative to the transverse movement of the paper-carriage, an actuating device for the adding wheels normally out of coöperative relation with the operating keys, and means for bringing the actuating device and operating keys into coöperative relation with each other.

45. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys, and means operated by the movement of the paper-carriage for bringing said actuating device and operating keys into coöperative relation with each other.

46. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys, and adjustable means intermediate said device and the paper-carriage for causing the movement of the paper-carriage to bring said device and the operating keys into coöperative relation with each other at any desired point in the travel of the carriage.

47. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys, means intermediate said device and the paper-carriage for causing the movement of the carriage to bring said device and operating keys into coöperative relation with each other, and a tabulating mechanism controlling the movement of the paper-carriage.

48. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys, adjustable means intermediate said device and the paper-carriage for causing the movement of the paper-carriage to bring said device and operating keys into coöperative relation with each other at any desired point in the travel of the paper-carriage, and a tabulating mechanism controlling the movement of the paper-carriage.

49. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and means for bringing said type keys and actuating device into coöperative relation with each other at a predetermined point in the movement of the paper-carriage.

50. The combination of a movable paper-carriage, the regular type-keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and means operated by the movement of the paper-carriage to bring said type keys and actuating device into coöperative relation with each other.

51. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and adjustable means operated by the movement of the paper-carriage to bring said type keys and actuating device into coöperative relation with each other at any desired point in the travel of the paper-carriage.

52. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and a tabulating mechanism controlling the movement of the paper-carriage and the coöperation of the type keys and actuating device.

53. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, means operated by the movement of the paper-carriage to bring said type keys and actuating device into coöperative relation with each other, and a tabulating mechanism controlling the movement of the paper-carriage.

54. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, adjustable means operated by the movement of the paper-carriage to bring said type keys and actuating device into coöperative relation with each other at any desired point in the travel of the paper-carriage, and a tabulating mechanism controlling the movement of the paper-carriage.

55. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, and means for connecting the actuating device with the paper-carriage and bringing it into coöperative relation with the operating keys.

56. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, and means for automatically connecting the two at a predetermined point in the travel of the carriage and bringing the actuating device into coöperative relation with the operating keys.

57. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, and means operated by the movement of the paper-carriage to connect the actuating device with the paper-carriage and bring it into coöperative relation with the operating keys.

58. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, and adjustable means intermediate said device and the paper-carriage for connecting the two at any desired point in the travel of the paper-carriage and bringing the actuating device into coöperative relation with the operating keys.

59. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, means for connecting the actuating device with the paper carriage and bringing it into coöperative relation with the adding keys, and a tabulating mechanism controlling the movement of the paper-carriage.

60. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, means operated by the movement of the paper-carriage for connecting the adding device with the paper-carriage and bringing it into coöperative relation with the operating keys, and a tabulating mechanism controlling the movement of the paper-carriage.

61. The combination of a movable paper-carriage, the operating keys and printing devices, a plurality of adding wheels mounted in fixed position relative to the transverse movement of the paper-carriage, an actuating device for said adding wheels normally out of coöperative relation with the operating keys and normally unaffected by the transverse movement of the paper-carriage, adjustable means intermediate said device and the paper-carriage for connecting the two at any desired point in the travel of the paper-carriage and bringing the actuating device into coöperative relation with the operating keys, and a tabulating mechanism for controlling the movement of the paper-carriage.

62. The combination of a movable paper-carriage, the regular type keys and printing devices of the typewriter, a plurality of adding wheels mounted in fixed position relative to the transverse movement of the paper-carriage, an actuating device for the adding wheels movable with the paper-carriage and adapted to be operated by certain of said type keys but normally out of coöperative relation with said keys, and a tabulating mechanism controlling the movement of the paper-carriage and the coöperation of said type keys and actuating device.

63. The combination of a movable paper-carriage, the regular type keys and printing devices of the typewriter, a plurality of adding wheels mounted in fixed position relative to the transverse movement of the paper-carriage, an actuating device for said adding wheels adapted to be operated by certain of said type keys but normally out of coöperative relation with said keys, and normally unaffected by the transverse movement of the paper-carriage, and means for connecting the actuating device with the paper-carriage and bringing the actuating device into coöperative relation with said type keys.

64. The combination of a movable paper-carriage, the regular type keys and printing devices of the typewriter, a plurality of adding wheels mounted in fixed position relative to the transverse movement of the paper-carriage, an actuating device for said adding wheels adapted to be operated by certain of said type keys but normally out of coöperative relation with said keys and normally unaffected by the transverse movement of the paper-carriage, and means for automatically connecting the actuating device with the paper-carriage at a predetermined point in the travel of the latter and bringing the actuating device into coöperative relation with said type keys.

65. The combination of a movable paper-carriage, the regular type keys and printing devices of the typewriter, a plurality of adding wheels mounted in fixed position relative to the transverse movement of the paper-carriage, an actuating device for said adding wheels adapted to be operated by certain of said type keys but normally out of coöperative relation with said keys, and normally unaffected by the transverse movement of the paper-carriage, and means operated by the paper-carriage for connecting the two and bringing the actuating device into coöperative relation with said type keys.

66. The combination of a movable paper-carriage, the regular type keys and printing devices of the typewriter, a plurality of adding wheels mounted in fixed position relative to the transverse movement of the paper-carriage, an actuating device for said adding wheels adapted to be operated by certain of said type keys but normally out of coöperative relation with said keys, and normally unaffected by the transverse movement of the paper-carriage, and adjustable means operated by the paper-carriage for connecting the two at any desired point in the travel of the paper-carriage and bringing said type keys into coöperative relation with the actuating device.

67. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and normally unaffected by the transverse movement of the paper-carriage, means for connecting the actuating device with the paper-carriage and bringing it into coöperative relation with the type keys, and means for releasing the paper-carriage and arresting it at any desired point in its travel.

68. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and normally unaffected by the transverse movement of the paper-carriage, means operated by the movement of the paper-carriage for connecting the actuating device with the paper-carriage and bringing it into coöperative relation with the type keys, and means for releasing the paper-carriage and arresting it at any desired point in its travel.

69. The combination of a movable paper-carriage, the regular type keys and printing devices of the typewriter, a plurality of adding wheels mounted in fixed position relative to the transverse movement of the paper-carriage, an actuating device adapted to be operated by certain of said keys but normally out of coöperative relation with said keys, and normally unaffected by the transverse movement of the paper-carriage, adjustable means intermediate said device and the paper-carriage for connecting the two at any desired point in the travel of the paper-carriage and bringing said type-keys and actuating device into coöperative relation with each other, and means for releasing the paper-carriage and arresting it at any desired point in its travel.

70. The combination of a movable paper-carriage, the regular type keys and printing devices of the typewriter, a plurality of adding wheels mounted in fixed position relative to the transverse movement of the paper-carriage, and an actuating device for the adding wheels adapted to be operated by certain of said keys but normally out of coöperative relation with said keys, and normally unaffected by the transverse movement of the paper-carriage, a plurality of tabulator keys representing different denominations of value, and means operated thereby and coöperating with the paper-carriage to release the carriage and arrest it at any desired denominational position and bring said type-keys and actuating device into coöperative relation with each other.

71. The combination of a movable paper-carriage, the regular type keys and printing devices of the typewriter, a plurality of adding wheels mounted in fixed position relative to the transverse movement of the paper-carriage, an actuating device for said wheels adapted to be operated by certain of said keys, but normally out of coöperative relation with said keys and normally unaffected by the transverse movement of the paper-carriage, adjustable means intermediate said device and the paper-carriage for connecting the two at any desired point in the travel of the carriage and bringing said type keys and actuating device into coöperative relation with each other, a plurality of tabulator keys representing different denominations of value, and means operated thereby and coöperating with the paper-carriage to move the carriage to any desired denominational position and cause it to move the actuating device to corresponding position relative to the adding wheels.

72. The combination of the transversely movable paper-carriage, a plurality of adding wheels mounted in front of the paper-carriage upon an axis parallel with the movement thereof, an actuating device for the adding wheels normally unaffected by the transverse movement of the paper-carriage and normally inoperable, means for connecting said device with the paper-carriage and causing the further movement of the carriage to automatically render said actuating device operable and also to positively move the actuating device in a direction reverse to the movement of the paper carriage, and means for operating the actuating device.

73. The combination of the transversely movable paper-carriage, a plurality of adding wheels mounted in front of the paper-carriage upon an axis parallel with the movement thereof, an actuating device for the adding wheels normally unaffected by the transverse movement of the paper-carriage and normally inoperable, means for automatically connecting said device with the paper-carriage and causing the further movement of the carriage to automatically render said actuating device operable and also to move the actuating device in a direction reverse to the movement of the paper carriage, and means for operating the actuating device.

74. The combination of the transversely movable paper-carriage, a plurality of adding wheels mounted in front of the paper-carriage upon an axis parallel with the movement thereof, an actuating device for the adding wheels normally unaffected by the transverse movement of the paper-carriage and normally inoperable, means operated by the movement of the paper-carriage for connecting the actuating device therewith, and causing the further movement of the carriage to automatically render said actuating device operable and also to move the actuating device in a direction reverse to the movement of the paper carriage, and means for operating the actuating device.

75. The combination of the transversely movable paper-carriage, a plurality of adding wheels mounted in front of the paper-carriage upon an axis parallel with the movement thereof, an actuating device for the adding wheels normally unaffected by the transverse movement of the paper-carriage and normally inoperable, adjustable means intermediate said device and the paper-carriage for automatically connecting the two at any desired point in the travel of the paper-carriage and causing its further movement to automatically render said actuating device operable and also to move the actuating device in a direction reverse to the movement of the paper carriage, and means for operating the actuating device.

76. The combination of the transversely movable paper-carriage, a plurality of adding wheels mounted in front of the paper-carriage upon an axis parallel with the movement thereof, an actuating device for the adding wheels normally unaffected by the movement of the paper-carriage and normally inoperable, means intermediate said device and the paper-carriage for connecting the two and causing the further movement of the paper-carriage toward the left to automatically render said actuating device operable and also to move the actuating device toward the right, a tabulating mechanism controlling the movement of the paper-carriage toward the left, and means for operating the actuating device.

77. The combination of the transversely movable paper-carriage, a plurality of adding wheels mounted in front of the paper-carriage upon an axis parallel with the movement thereof, an actuating device for said wheels normally unaffected by the transverse movement of the paper-carriage and normally inoperable, adjustable means intermediate said device and the paper-carriage for connecting the two at any desired point in the travel of the paper-carriage and causing its further movement toward the left to automatically render said actuating device operable and also to move the actuating device toward the right, a tabulating mechanism controlling the movement of the paper-carriage toward the left, and means for operating the actuating device.

78. The combination of the transversely movable paper-carriage, a plurality of adding wheels, a normally inoperable actuating device for the adding wheels, a rack moving with the paper-carriage, a pinion normally disengaged from said rack but adapted to be engaged and turned thereby during the movement of the paper-carriage toward the left, and means operated by said pinion for rendering the actuating device operable and for advancing the actuating device from one adding wheel to another.

79. The combination of the transversely movable paper-carriage, a plurality of adding wheels mounted in fixed position relative to the transverse movement of the paper carriage, an actuating device for the adding wheels a rack moving with the paper-carriage and adjustable lengthwise thereof, a pinion normally disengaged from said rack but adapted to be engaged and turned thereby at a point in the travel of the paper-carriage determined by the adjustment of the rack, and means operated by said pinion for advancing the actuating device from one adding wheel to another.

80. The combination of the transversely movable paper-carriage, a plurality of adding wheels, an actuating device therefor, a rack moving with the paper-carriage, a pinion normally disengaged from said rack but adapted to be engaged and turned thereby during the travel of the paper-carriage, means operated by said pinion for advancing the actuating device from one adding wheel to another, and means for throwing the rack and pinion out of coöperative relation with each other at will.

81. The combination of the transversely movable paper-carriage, a plurality of adding wheels, an actuating device therefor, a rack moving with the paper-carriage adjustable lengthwise thereof, a pinion normally disengaged from said rack but adapted to be engaged and turned thereby at a point in the travel of the paper-carriage determined by the adjustment of said rack, means operated by said pinion for advancing the actuating device from one adding wheel to another, and means for throwing the rack and pinion out of coöperative relation with each other at will.

82. The combination of the transversely movable paper-carriage, a plurality of adding wheels, a rack moving with said carriage adjustable lengthwise thereof, a pinion adapted to be engaged and turned by said rack during the movement of the paper-carriage toward the left, a second pinion driven by the first mentioned pinion, a longitudinally movable rack-bar meshing with said second pinion, and an actuating device for the adding wheels moving with said rack-bar.

83. The combination of the transversely movable paper-carriage, a plurality of adding wheels mounted in front of the paper-carriage upon an axis parallel with the movement thereof, a rack moving with the paper-carriage adjustable lengthwise thereof, a shaft mounted at right angles to the paper-carriage and projecting forwardly therefrom, a pinion on the rear end of said shaft adapted to be engaged and turned by the rack upon the paper-carriage, a second pinion upon the forward end of said shaft, a longitudinally movable rack-bar meshing with said second pinion, and an actuating device for the adding wheels moving with said bar.

84. The combination of the transversely movable paper-carriage, a plurality of sets of adding wheels, an actuating device common to all of the sets of adding wheels, adjustable means intermediate said device and the paper-carriage for automatically connecting, disconnecting and re-connecting them at any desired points in the movement of the carriage toward the left, to cause the paper-carriage to move the adding device to the right past the several sets of adding wheels and release it and permit it to come to rest between said sets, and means for operating the actuating device.

85. The combination of the transversely movable paper-carriage, a plurality of sets of adding wheels, an actuating device common to all of said sets, a plurality of racks moving with the paper-carriage corresponding to the several sets of adding wheels, a pinion adapted to be engaged successively by said racks during the travel of the paper-carriage, and a connection between said pinion and the actuating device for causing the turning of the pinion by the racks to move the actuating device past the corresponding sets of adding wheels.

86. The combination of the transversely movable paper-carriage, a plurality of sets of adding wheels, an actuating device common to all of said sets, a plurality of racks corresponding to the several sets of adding wheels, moving with the paper-carriage and independently adjustable lengthwise thereof, a pinion adapted to be engaged and turned in succession by said racks, and a connection between said pinion and the actuating device for causing the turning of the pinion by the racks to move the actuating device past the several sets of adding wheels.

87. The combination of the transversely movable paper-carriage, a plurality of sets of adding wheels, an actuating device common to all of said sets, a corresponding number of racks moving with the paper-carriage, a pinion adapted to be engaged and turned by said racks in succession, and a longitudinally movable rack-bar operated by said pinion and connected to the actuating device to move the latter past the several sets of adding wheels as the pinion is engaged and turned by the racks during the movement of the paper-carriage.

88. The combination of the transversely movable paper-carriage, a plurality of sets of adding wheels mounted in front of the paper-carriage upon an axis parallel with the movement thereof, a corresponding number of racks moving with the paper-carriage, a shaft mounted at right angles to the paper-carriage and extending forwardly therefrom, a pinion fast upon the rear end of said shaft and adapted to be engaged and turned in succession by the racks during the movement of the paper-carriage toward the left, a second pinion fast upon the forward end of said shaft, a longitudinally movable rack-bar meshing with said second pinion, and an actuating device for the adding wheels moving with the rack-bar.

89. The combination of the transversely movable paper-carriage, a plurality of sets of adding wheels mounted in front of the paper-carriage upon an axis parallel with the movement thereof, a corresponding number of racks movable with the paper-carriage and adjustable lengthwise thereof, a shaft mounted at right angles to the paper-carriage and extending forwardly therefrom, a pinion fast upon the rear end of said shaft and adapted to be engaged and turned in succession by the racks during the movement of the paper-carriage toward the left, a second pinion fast upon the forward end of said shaft, a longitudinally movable rack-bar meshing with said second pinion, and an actuating device for the adding wheels moving with the rack-bar.

90. The combination of the transversely movable paper-carriage, a plurality of adding wheels, an actuating device for the adding wheels normally inoperable, a rack moving with the carriage, a pinion adapted to be turned by said rack during the movement of the paper-carriage toward the left, means operated by said pinion for rendering the actuating device operable and for advancing the actuating device from one adding wheel to another, and a tabulating mechanism controlling the movement of the paper-carriage.

91. The combination of the transversely movable paper-carriage, a plurality of adding wheels, an actuating device for the adding wheels normally inoperable, a rack moving with the paper-carriage, a pinion normally disengaged from said rack but adapted to be engaged and turned thereby during the movement of the paper-carriage toward the left, means operated by said pinion for rendering the actuating device operable and for advancing the actuating device from one adding wheel to another, and a tabulating mechanism controlling the movement of the paper-carriage.

92. The combination of the transversely movable paper-carriage, a plurality of adding wheels, an actuating device for said wheels normally inoperable, a rack moving with the paper-carriage and adjustable lengthwise thereof, a pinion normally disengaged from said rack but adapted to be engaged and turned thereby at a point in the travel of the paper-carriage determined by the adjustment of the rack, means operated by said pinion for rendering the actuating device operable and for advancing the actuating device from one adding wheel to another, and a tabulating mechanism controlling the movement of the paper-carriage.

93. The combination of the transversely movable paper-carriage, a plurality of sets of adding wheels, an actuating device common to all of said sets, a plurality of racks moving with the paper-carriage and corresponding to the several sets of adding wheels, a pinion adapted to be engaged successively by said racks during the movement of the paper-carriage toward the left, a connection between said pinion and the actuating device for causing the turning of the pinion by the racks to move the actuating device past the corresponding sets of adding wheels, and a tabulating mechanism embodying a plurality of stops corresponding to the several sets of racks and adding wheels for controlling the movement of the paper-carriage.

94. The combination of the transversely movable paper-carriage, a plurality of sets of adding wheels, an actuating device common to all of said sets, a plurality of racks corresponding to the several sets of adding wheels, moving with the paper-carriage and independently adjustable lengthwise thereof, a pinion adapted to be engaged and turned in succession by said racks during the movement of the paper-carriage toward the left, a connection between said pinion and the actuating device for causing the turning of the pinion by the racks to move the actuating device past the several sets of adding wheels, and a tabulating mechanism embodying a plurality of stops corresponding to the several racks and sets of adding wheels for controlling the movement of the paper-carriage.

95. The combination of the transversely movable paper-carriage, a plurality of adding wheels mounted in front of the paper-carriage upon an axis parallel with the movement thereof, an actuating device for the adding wheels normally inoperable, a rack moving with the paper-carriage, a pinion normally disengaged from said rack but adapted to be engaged and turned thereby during the movement of the paper-carriage toward the left, and means operated by said pinion for rendering the actuating device operable and for moving the actuating device to the right from one adding wheel to another.

96. The combination of the transversely movable paper-carriage, a plurality of adding wheels mounted in front of the paper-carriage upon an axis parallel with the movement of the paper-carriage, an actuating device therefor normally inoperable, a rack moving with the paper-carriage and adjustable lengthwise thereof, a pinion normally disengaged from said rack but adapted to be engaged and turned thereby at a point in the travel of the paper-carriage determined by the adjustment of the rack, and means operated by said pinion for rendering the actuating device operable and for moving the actuating device to the right from one adding wheel to another.

97. The combination of the transversely movable paper-carriage, a plurality of adding wheels mounted in front of said carriage upon an axis parallel with the movement thereof, an actuating device therefor normally inoperable, a rack moving with the paper-carriage, a pinion normally disengaged from said rack but adapted to be engaged and turned thereby during the movement of the paper-carriage toward the left, means operated by said pinion for rendering the actuating device operable and for moving the actuating device to the right from one adding wheel to another, and means for throwing the rack and pinion out of coöperative relation with each other at will.

98. The combination of the transversely movable paper-carriage, a plurality of adding wheels mounted in front of said carriage upon an axis parallel therewith, a rack moving with the paper-carriage and adjustable lengthwise thereof, a pinion normally disengaged from said rack but adapted to be engaged and turned thereby at a point in the movement of the paper-carriage toward the left determined by the adjustment of said rack, means operated by said pinion for moving the actuating device to the right from one adding wheel to another, and means for throwing the rack and pinion out of coöperative relation with each other at will.

99. The combination of the transversely movable paper-carriage, a plurality of sets of adding wheels mounted in front of said carriage upon an axis parallel with the movement thereof, an actuating device common to all of the sets of adding wheels, a plurality of racks moving with the paper-carriage, a pinion adapted to be engaged and turned by said racks in succession during the movement of the paper-carriage toward the left, and means operated by said pinion for moving the actuating device to the right past the several sets of adding wheels.

100. The combination of the transversely movable paper-carriage, a plurality of sets of adding wheels mounted in front of said carriage upon an axis parallel therewith, an actuating device common to the several sets of adding wheels, a plurality of racks moving with the paper-carriage and adjustable lengthwise thereof independently of each other, a pinion adapted to be engaged and turned by said racks in succession during the movement of the paper-carriage toward the left and at points therein determined by the adjustment of said racks, and means operated by said pinion for moving the actuating device toward the right past the several sets of adding wheels.

101. The combination of the transversely movable paper-carriage, a plurality of sets of adding wheels mounted in front of said carriage upon an axis parallel with the movement thereof, an actuating device common to the several sets of adding wheels, a plurality of racks moving with the paper-carriage, a pinion adapted to be engaged and turned by said racks in succession during the movement of the paper-carriage toward the left, means operated by said pinion for moving the actuating device toward the right past the several sets of wheels, and means for throwing the racks and pinion out of coöperative relation with each other at will.

102. The combination of the transversely movable paper-carriage, a plurality of sets of adding wheels mounted in front of said carriage upon an axis parallel with the movement thereof, an actuating device common to the several sets of adding wheels, a plurality of racks moving with the paper-carriage and adjustable lengthwise thereof, a pinion adapted to be engaged and turned by said racks in succession during the movement of the paper-carriage toward the left, and at points therein determined by the adjustment of said racks, means operated by said pinion for moving the actuating device to the right from one adding wheel to another and means for throwing the racks and pinion out of coöperative relation with each other at will.

103. The combination of the transversely movable paper-carriage, a plurality of adding wheels, an actuating device therefor, a rack moving with the paper-carriage adjustable lengthwise thereof, a stop for arresting the movement of the paper-carriage adjustable in correspondence with the adjustment of the rack, means for moving the paper-carriage toward the left to position determined by said stop, a pinion adapted to be engaged and turned by the rack, and a connection between said pinion and actuating device for causing the turning of the pinion by the rack to move the actuating device toward the right past the adding wheels.

104. The combination of the transversely movable paper-carriage, a plurality of sets of adding wheels, an actuating device common to all of said sets, a plurality of racks moving with the paper-carriage and adjustable lengthwise thereof, one corresponding to each set of adding wheels, a plurality of stops for arresting the paper-carriage in different columnar positions and adjustable in correspondence with the adjustment of the racks, means for moving the paper-carriage to successive positions determined by said stops, a pinion adapted to be engaged and turned by said racks in succession during the movement of the paper-carriage toward the left, and a connection between said pinion and the actuating device for causing the turning of the pinion by the racks to move the actuating device toward the right past the several sets of adding wheels.

105. The combination of the transversely movable paper-carriage, a plurality of adding wheels, an actuating device therefor, operating keys for said actuating device normally out of coöperative relation therewith, a rack moving with the paper-carriage, a pinion adapted to be engaged and turned by said rack during the movement of the paper-carriage toward the left, and means operated by said pinion for bringing the operating keys and actuating device into coöperative relation with each other.

106. The combination of the transversely movable paper-carriage, a plurality of adding wheels, an actuating device therefor, operating keys for said actuating device normally out of coöperative relation therewith, a rack moving with the paper-carriage adjustable lengthwise thereof, a pinion adapted to be engaged and turned by said rack during the movement of the paper-carriage toward the left, and means operated by said pinion for bringing the operating keys and actuating device into coöperative relation with each other at any desired point in the travel of the paper-carriage determined by the adjustment of the rack.

107. The combination of the transversely movable paper-carriage, a plurality of adding wheels mounted in front of said carriage upon an axis parallel with the movement thereof, operating keys therefor normally out of coöperative relation therewith, a rack moving with the paper-carriage, a pinion adapted to be engaged and turned by said rack during the movement of the paper-carriage toward the left, and means operated by said pinion for bringing the operating keys and adding mechanism into coöperative relation with each other.

108. The combination of the transversely movable paper-carriage, a plurality of adding wheels mounted in front of said carriage upon an axis parallel with the movement thereof, operating keys therefor normally out of coöperative relation therewith, a rack moving with the paper-carriage and adjustable lengthwise thereof, a pinion adapted to be engaged and turned by said rack during the movement of the paper-carriage toward the left, and means operated by said pinion for bringing the operating keys and adding mechanism into coöperative relation with each other at any desired point in the travel of the paper-carriage determined by the adjustment of the rack.

109. The combination of the transversely movable paper-carriage, a plurality of sets of adding wheels, operating keys therefor normally out of coöperative relation therewith, a plurality of racks moving with the paper-carriage, a pinion adapted to be engaged and turned by said racks in succession during the movement of the paper-carriage toward the left, and means operated by said pinion for bringing the operating keys and adding mechanism into coöperative relation with each other during the time the pinion is being turned by each of the racks.

110. The combination of the transversely movable paper-carriage, a plurality of sets of adding wheels, operating keys therefor normally out of coöperative relation therewith, a plurality of racks moving with the paper-carriage and adjustable lengthwise thereof independently of each other, a pinion adapted to be engaged and turned by said racks in succession during the movement of the paper-carriage toward the left, and means operated by said pinion for bringing the adding mechanism and operating keys into coöperative relation with each other during the time the pinion is being turned by the racks and at points in the travel of the paper-carriage determined by the adjustment of the racks.

111. The combination of the transversely movable paper-carriage, the regular type-keys and printing devices of the typewriter, a plurality of adding wheels, an actuating device therefor adapted to be operated by certain of said keys but normally out of coöperative relation therewith, a rack moving with the paper-carriage, a pinion adapted to be engaged and turned by said rack during the movement of the paper-carriage toward the left, and means operated by said pinion to bring said type keys and actuating device into coöperative relation with each other.

112. The combination of the transversely movable paper-carriage, a plurality of adding wheels, an actuating device therefor, operating keys for said actuating device normally out of coöperative relation therewith, a rack moving with the paper-carriage a pinion adapted to be engaged and turned by said rack, means operated by said pinion to bring the operating keys and actuating device into coöperative relation with each other, and means for throwing said rack and pinion into and out of coöperative relation with each other at will.

113. The combination of the transversely movable paper-carriage, a plurality of adding wheels, an actuating device therefor, operating keys for said actuating device normally out of coöperative relation therewith, a rack moving with the paper-carriage adjustable lengthwise thereof, a pinion adapted to be engaged and turned by said rack, means operated by said pinion for bringing the operating keys and actuating device into coöperative relation with each other at a point in the travel of the paper-carriage determined by the adjustment of said rack, and means for throwing said rack and pinion into and out of coöperative relation with each other at will.

114. The combination of the transversely movable paper-carriage, a plurality of sets of adding wheels, operating keys therefor normally out of coöperative relation therewith, a plurality of racks moving with the paper-carriage and corresponding to the several sets of adding wheels, a pinion adapted to be engaged and turned by said racks in succession, means operated by said pinion for bringing the operating keys and adding mechanism into coöperative relation with each other during the turning of the pinion by the racks, and means for throwing the racks into and out of coöperative relation with the pinion independently of each other at will.

115. The combination of the transversely movable paper-carriage, a plurality of sets of adding wheels, operating keys therefor normally out of coöperative relation therewith, a plurality of racks corresponding to the several sets of adding wheels moving with the paper-carriage and adjustable lengthwise thereof independently of each other, a pinion adapted to be engaged and turned by said racks in succession, means operated by said pinion for bringing the operating keys and adding mechanism into coöperative relation with each other during the turning of the pinion by the racks and at points in the travel of the paper-carriage determined by the adjustment of said racks, and means for throwing said racks into and out of coöperative relation with the pinion independently of each other at will.

116. The combination of the transversely movable paper-carriage, the regular type keys and printing devices of the typewriter, a plurality of adding wheels, an actuating device therefor adapted to be operated by certain of said keys but normally out of coöperative relation therewith, a rack moving with the paper-carriage, a pinion adapted to be engaged and turned by said rack, means operated by said pinion for bringing said type keys and actuating device into coöperative relation with each other, and means for throwing the rack into and out of coöperative relation with the pinion at will.

117. The combination of the transversely movable paper-carriage, a plurality of adding wheels, an actuating device therefor, operating keys for said actuating device normally out of coöperative relation therewith, a rack moving with the paper-carriage, a pinion adapted to be engaged and turned by said rack during the movement of the paper-carriage toward the left, means operated by said pinion for bringing the operating keys and actuating device into coöperative relation with each other, and a tabulating mechanism controlling the movement of the paper-carriage 118. The combination of the transversely movable paper-carriage, a plurality of adding wheels, an actuating device therefor, operating keys for said actuating device normally out of coöperative relation therewith, a rack moving with the paper-carriage and adjustable lengthwise thereof, a pinion adapted to be engaged and turned by said rack during the movement of the paper-carriage toward the left, means operated by said pinion for bringing the operating keys and actuating device into coöperative relation with each other at any desired point in the travel of the paper-carriage determined by the adjustment of the rack, and a tabulating mechanism controlling the movement of the paper-carriage.

119. The combination of the transversely movable paper-carriage, a plurality of sets of adding wheels, operating keys therefor normally out of coöperative relation therewith, a plurality of racks moving with the paper-carriage, a pinion adapted to be engaged and turned by said racks in succession during the movement of the paper-carriage toward the left, means operated by said pinion for bringing the operating keys and adding mechanism into coöperative relation with each other during the time the pinion is being turned by each of the racks, and a tabulating mechanism controlling the movement of the paper-carriage.

120. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, and means for swinging said bail into the path of said cams.

121. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, and means for automatically swinging said bail into the path of said cams at a predetermined point in the movement of the paper-carriage.

122. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, and means operated by the movement of the paper-carriage to swing said bail into the path of said cams.

123. The combination of the transversely movable paper-carriage, an adding mechanism, operating keys therefor provided with differential cams corresponding to their respective values, a swinging bail normally out of the path of said cams but adapted to be swung into their path and operated by them to transmit their movement to the adding mechanism, and adjustable means operated by the movement of the paper-carriage for swinging said bail into the path of said cams at any desired point in the travel of the carriage.

124. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, and a tabulating mechanism controlling the movement of the paper-carriage and operable to swing said bail in to the path of said cams.

125. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, means operated by the movement of the paper-carriage to swing said bail into the path of said cams, and a tabulating mechanism controlling the movement of the paper-carriage.

126. The combination of the transversely movable paper-carriage, an adding mechanism, operating keys therefor provided with differential cams corresponding to the values of the several keys, a swinging bail normally out of the path of said cams but adapted to be swung into their path and operated by them to transmit the movements of the keys to the adding mechanism, adjustable means operated by the movement of the paper-carriage for swinging said bail into the path of said cams at any desired point in the travel of the paper-carriage, and a tabulating mechanism controlling the movement of the paper-carriage.

127. The combination of the transversely movable paper-carriage, an adding mechanism, operating keys therefor provided with differential cams corresponding to their respective values, a swinging bail normally out of the path of said cams but adapted to be swung into their path and operated by them to transmit their movements to the adding mechanism, a rack moving with the paper-carriage, a pinion adapted to be engaged and turned by said rack, and means operated by said pinion to swing the bail into the path of the cams.

128. The combination of the transversely movable paper-carriage, an adding mechanism, operating keys therefor provided with differential cams corresponding to their respective values, a swinging bail normally out of the path of said cams but adapted to be swung into their path and operated by them to transmit their movement to the adding mechanism, a rack moving with the paper-carriage adjustable lengthwise thereof, a pinion adapted to be engaged and turned by said rack, and means operated by the pinion to swing the bail into the path of the cams at any desired point in the travel of the paper-carriage determined by the adjustment of the rack.

129. The combination of the transversely movable paper-carriage, an adding mechanism, operating keys therefor provided with differential cams corresponding to their respective values, a swinging bail normally out of the path of said cams but adapted to be swung into their path and be operated by them to transmit their movement to the adding mechanism, a rack moving with the paper-carriage, a pinion adapted to be engaged and turned by said rack, means operated by said pinion for swinging the bail into the path of the cams, and means for throwing the rack into and out of coöperative relation with the pinion at will.

130. The combination of the transversely movable paper-carriage, a plurality of sets of adding wheels, operating keys therefor provided with differential cams corresponding to their respective values, a swinging bail common to the adding mechanism of all of the sets of adding wheels and adapted to be swung into the path of the cams and operated by them to transmit their movements to the adding mechanism, but normally standing out of their path of movement, a plurality of racks moving with the paper-carriage and corresponding to the several sets of adding wheels, a pinion adapted to be engaged and turned by said racks in succession, and means operated by said pinion for swinging the bail into the path of the cams during the time the pinion is being turned by the successive racks.

131. The combination of the transversely movable paper-carriage, a plurality of sets of adding wheels, operating keys therefor provided with differential cams corresponding to their respective values, a swinging bail common to the adding mechanism of all of the sets of adding wheels and adapted to be swung into the path of the cams and operated by them to transmit their movements to the adding mechanism, but normally standing out of their path of movement, a plurality of racks corresponding to the several sets of adding wheels moving with the paper-carriage and adjustable lengthwise thereof independently of each other, a pinion adapted to be engaged and turned by said racks in succession, and means operated by said pinion to swing the bail into the path of the cams as the pinion is turned by the successive racks and at points in the travel of the paper-carriage determined by the adjustment of the racks thereon.

132. The combination of the transversely movable paper-carriage, an adding mechanism, operating keys therefor provided with differential cams corresponding to their respective values a swinging bail normally out of the path of said cams but adapted to be swung into their path and operated by them to transmit their movement to the adding mechanism, a rack moving with the paper-carriage, a pinion adapted to be engaged and turned by said rack, means operated by said pinion to swing the bail into the path of the cams, and a tabulating mechanism controlling the movement of the paper-carriage.

133. The combination of a plurality of adding wheels, a swinging bail parallel with the axis of said wheel, an actuating device for the adding wheels carried by said bail and movable longitudinally thereof from one adding wheel to another and means for imparting differential movements to said bail.

134. The combination of a plurality of adding wheels, a swinging bail parallel with the axis thereof, an actuating device for the adding wheels carried by said bail and movable lengthwise thereof, and a plurality of operating keys of different values for imparting differential movements to said bail.

135. The combination of a plurality of adding wheels, a swinging bail parallel with the axis thereof, an actuating device for said wheels carried by said bail and movable longitudinally thereof, a second swinging bail moving with the first mentioned one, and a plurality of operating keys provided with differential cams coöperating with the second bail to impart different degrees of movement to the first mentioned bail and the actuating device.

136. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for causing the transverse movement of the paper-carriage to move said actuating device lengthwise of the bail, and means for imparting differential movement to said bail.

137. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for causing the transverse movement of the paper-carriage to move said actuating device lengthwise of the bail in a direction opposite to the movement of the paper-carriage, and means for imparting differential movement to said bail.

138. The combination of the transversely movable paper-carriage, a plurality of adding wheels and a swinging bail parallel with the axis thereof, an actuating device for the adding wheels carried by said bail and movable longitudinally thereof, a rack-bar connected to said actuating device and movable lengthwise parallel with the swinging bail, means for throwing said rack-bar into and out of gear with the paper-carriage, and means for imparting differential movement to said bail.

139. The combination of the transversely movable paper-carriage, a plurality of adding wheels, a swinging bail parallel with the axis thereof, an actuating device for the adding wheels carried by said bail and movable longitudinally thereof, a rack-bar connected to said actuating device and movable lengthwise parallel with the swinging bail, a pinion geared to said rack-bar, a rack upon the paper-carriage adapted to engage and turn said pinion, and means for imparting differential movement to said bail.

140. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for moving said device lengthwise of the bail, and a plurality of operating keys for imparting differential movement to said bail.

141. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for moving said device lengthwise of the bail, a plurality of operating keys for imparting differential movement to said bail but normally out of coöperating relation therewith, and means operated by the movement of the paper-carriage to automatically bring said keys and bail into coöperative relation with each other.

142. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for moving said device lengthwise of the bail, a second swinging bail moving with the first bail, and a plurality of operating keys provided with differential cams coöperating with said second bail to impart different degrees of movement thereto.

143. The combination of the transversely movable paper-carriage, a plurality of adding wheels, a swinging bail parallel with the axis thereof, an actuating device for the adding wheels carried by said bail and movable longitudinally thereof, means intermediate said actuating device and the paper-carriage for moving said device lengthwise of the bail, a second swinging bail moving with the first bail, a plurality of operating keys provided with differential cams adapted to coöperate with said second bail to impart different degrees of movement thereto but normally out of coöperative relation therewith, and means operated by the movement of the paper-carriage for automatically bringing the bail and keys into coöperative relation with each other.

144. The combination of the adder-actuating gears 51, the pawl-carrying levers 53, the pawls 54 carried thereby and engaging the gears, the links 55 connected to said levers and provided with the notches 60, the swinging bail 63, the actuating device 62 carried thereby and movable longitudinally thereof, and provided with the finger 61 adapted to coöperate with the notches 60 in the links 55, and means for actuating the bail 63.

145. The combination of the adder-actuating gears 51, the levers 53, the pawls 54 carried thereby and engaging said gears, the links 55 connected to said levers and provided with the notches 60 and studs 56, the guide plates 58 provided with the slots 57 engaging the studs 56, the swinging bail 63, the actuating device 62 carried thereby and movable longitudinally thereof, and provided with the finger 61 coöperating with the notches 60 in the links 55, and means for actuating the bail 63.

146. The combination of the adder-actuating gear 51, the levers 53, the pawls 54 carried by said levers and coöperating with the gears 51, the links 55 connected to the levers 53 and provided with the notches 60, the swinging bail 63, the actuating device 62 carried by said bail and movable longitudinally thereof, and provided with the finger 61 coöperating with the notches 60 of the links 55, the transversely movable paper-carriage, means intermediate the same and the actuating device 62 for moving the latter lengthwise of the bail 63, and means for actuating said bail.

147. The combination of the swinging bail 63, the adder-actuating device 62 carried thereby and movable longitudinally thereof, the block 66 movable lengthwise of the bail 63 and parallel therewith, and connected to the actuating device 62 to carry the latter with it and to also guide it in its vertical movement with the swinging bail, and means for supporting the block 66 and moving it lengthwise of the bail.

148. The combination of the swinging bail 63, the adder-actuating device 62 carried thereby and movable longitudinally thereof, and provided with the slot 70, the block 66 movable longitudinally of the bail 63 and parallel therewith and carrying the stud 69 extending through the slot 70 in the actuating device 62 and connecting the latter with said block, and means for supporting the block and moving it longitudinally of the bail 63.

149. The combination of the swinging bail 63, the adder-actuating device 62 carried thereby and movable longitudinally thereof, and provided with the slot 70, the block 66 provided with the projecting ear 68 at one side of the actuating device 62, the headed stud or bolt 69 passed through the slot 70 of the actuating device from the opposite side thereof and secured in the ear 68 of the block 66, and means for supporting said block and moving it lengthwise of the bail 63.

150. The combination of the swinging bail 63, the adder-actuating device 62 carried thereby and provided with the slot 70, the block 66 provided with the depending slotted extension 71 curved concentrically to the pivotal support of the bail and embracing the actuating device 62, the stud 69 passing through the slot 70 of said actuating device and connecting the latter to the block 66, and means for supporting the block 66 and moving it lengthwise of the bail 63.

151. The combination of the adder-actuating gears 51, the pawl levers and pawls 53 54, the links 55 provided with the notches 60, the swinging bail 63, the actuating device 62 carried by said bail and movable longitudinally thereof, and provided with the fingers 61 adapted to coöperate with the notches 60 of the links 55 but normally out of the horizontal plane thereof, a movable paper carriage, means operated by the movement of the paper-carriage for swinging the bail 63 to position to bring the finger 61 into the horizontal plane of the notches 60, means for actuating the bail 63, and means intermediate the actuating device 62 and the paper-carriage for moving said device lengthwise of the bail 63.

152. The combination of the adder-actuating gears 51, the pawl levers and pawls 53 54, the links 55 provided with the notches 60, the swinging bail 63, the actuating device 62 carried by said bail and movable longitudinally thereof, and provided with the fingers 61 adapted to coöperate with the notches 60 of the links 55 but normally out of the horizontal plane thereof, the arm 81 connected to the bail 63 and carrying the roller 82, the shaft 74, the collar 83 fast thereon and provided with the notch 85 coöperating with the roller 82, a movable paper carriage, and means operated by the movement of the paper-carriage for turning the shaft 74 to force the roller 82 out of the notch 85 and swing the bail 63 to position to bring the finger 61 of the actuating device into the horizontal plane of the notches 60 of the links 55.

153. The combination of the adder-actuating gears 51, the pawl levers and pawls 53 54, the links 55 provided with the notches 60, the swinging bail 63, the actuating device 62 carried thereby and provided with the finger 61 adapted to coöperate with the notches 60 of the links 55, the bail 78 moving with the bail 63, the operating keys 1 provided with the cams 79 adapted to coöperate with the bail 78, the arm 81 connected to the bails 63 and 78 and carrying the roller 82, the shaft 74, the collar 83 fast thereon and provided with the notch 85 coöperating with the roller 82, a movable paper carriage, and means operated by the movement of the paper-carriage for turning the shaft 74 and forcing the roller 82 out of the notch 85 and thereby swinging the finger 61 of the actuating device into the horizontal plane of the notches 60 of the links 55, and the bail 78 into the path of the cams 79 of the operating keys 1.

154. The combination of the adder-actuating gears 51, the pawl levers and pawls 53 54, the links 55 provided with the notches 60, the rock-shaft 65, the bail 63 carried thereby, the actuating device 62 carried by the bail 63 and provided with the finger 64 adapted to coöperate with the notches 60 of the links 55, the operating keys 1 provided with the cams 79, the bail 78 also fast upon the rock-shaft 65 and normally out of the path of the cams 79, the spring 80 for yieldingly holding the bails 63 and 68 in normal position, the arm 86 fast upon the rock-shaft 65, the arm 81 loose thereon and provided with the lug 87 coöperating with the arm 86, the shaft 74, the collar 83 fast thereon and provided with the notch 85, the roller 82 carried by the arm 81 and normally engaging the notch 85, the spring 84 connected to the arm 81 for yieldingly holding the roller 82 in engagement with the notch 85 of the collar 83, a movable paper carriage, and means operated by the movement of the paper-carriage for turning the shaft 74 and for moving the actuating device 62 longitudinally of the bail 63.

155. The combination of the paper-carriage, the rack-plate 76 thereon, and the pinion 75 provided with the enlarged tooth c and adapted to coöperate with the rack-plate 76.

156. The combination of the paper-carriage, the pinion 75, and the rack-plate 76 mounted upon the paper-carriage and movable thereon into and out of position to coöperate with the pinion.

157. The combination of the paper-carriage, the pinion 75, and the rack-plate 76 adjustable longitudinally of the paper-carriage and movable thereon into and out of position to coöperate with the pinion.

158. The combination of the paper-carriage, the pinion 75, the rack-plate 76 mounted upon the paper-carriage and movable thereon into and out of coöperative relation with the pinion, and a spring for holding said rack-plate in its opposite positions.

159. The combination of the paper-carriage, the bar 90 carried thereby, the pinion 75, and the rack-plate 76 hung upon the bar 90 and adapted to be swung into and out of locked engagement therewith and into and out of coöperative relation with the pinion.

160. The combination of the paper-carriage, the bar 90 carried thereby, the pinion 75, the rack-plate 76 hung upon the bar 90 and adapted to be swung into and out of locked engagement therewith and into and out of coöperative relation with the pinion, and means for holding the rack-plate in its opposite positions.

161. The combination of the paper-carriage, the bar 90 carried thereby, the pinion 75, the rack-plate 76 hung upon the bar 90 and adapted to be swung into and out of locked engagement therewith and into and out of coöperative relation with the pinion, and the spring 95 interposed between the bar 90 and rack-plate 76 for holding the latter in its opposite positions.

162. The combination of the paper-carriage, the rack-bar 90 carried thereby, the rack-plate 76 mounted upon the bar 90 and provided with the locking plate 96 coöperating with the teeth of said bar, and the pinion 75 adapted to be turned by the rack 76.

163. The combination of the paper-carriage, the rack-bar 90 carried thereby, the rack-plate 76 hung upon said bar and provided with a locking plate 96 adapted to be swung into and out of engagement with the teeth upon the bar 90, and the pinion 75 coöperating with the rack 76.

164. The combination of the paper-carriage, the rack-bar 90 carried thereby, the rack-plate 76 hung thereon and provided with the thumb-piece 92 and with the locking plate 96 coöperating with the teeth of the bar 90, and the pinion 75 coöperating with the rack 76.

165. The combination of the paper-carriage, the pinion 75, the bar 90 and guide plate 93 carried thereby and forming the guideway 90ª between them, the rack-plate 76 hung upon the upper edge of the bar 90 and adapted to be swung thereon into and out of coöperative relation with the pinion 75, and into and out of locked engagement with the bar 90, and the spring 95 for holding the rack-plate in its opposite positions.

166. The combination of the paper-carriage, the pinion 75, the rack-bar 90 and guide-plate 93 carried by the paper-carriage and forming the guideway 90ª between them, the rack-plate 76 hung upon the bar 90 and provided with the locking plate 96 adapted to be engaged with and disengaged from the teeth of the rack-bar 90 as the rack-plate is swung into and out of coöperative relation with the pinion, and the spring 95 interposed between the rack-plate and the upper edge of the rack-bar 90 for holding the rack-plate in its opposite positions.

167. The combination of the adding wheels 48 provided with the pinions 50, the gear wheels 51 meshing with said pinion and provided with the lugs 105, the levers 101, each provided with a cam surface 106 coöperating with the lugs 105 upon a given wheel 51 and carrying a pawl 100 coöperating with the next higher gear wheel in the series, the springs 103 connected to said levers, and the stops 104 for arresting their movement under the action of said springs.

HARVEY L. FISHER.

Witnesses:
 EDWARD RECTOR,
 LOUIS B. ERWIN.